United States Patent
Zhang et al.

(10) Patent No.: US 10,757,725 B2
(45) Date of Patent: Aug. 25, 2020

(54) GRANT-FREE TRANSMISSION METHOD, NETWORK DEVICE, AND TERMINAL DEVICE

(71) Applicant: Huawei Technologies Co., Ltd., Shenzhen (CN)

(72) Inventors: Jinfang Zhang, Shanghai (CN); Lei Lu, Shanghai (CN); Jin Liu, Shenzhen (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 0 days.

(21) Appl. No.: 16/365,052

(22) Filed: Mar. 26, 2019

(65) Prior Publication Data

US 2019/0223203 A1 Jul. 18, 2019

Related U.S. Application Data

(63) Continuation of application No. PCT/CN2017/098315, filed on Aug. 21, 2017.

(30) Foreign Application Priority Data

Sep. 26, 2016 (CN) .......................... 2016 1 0850117

(51) Int. Cl.
*H04W 72/12* (2009.01)
*H04L 1/16* (2006.01)
(Continued)

(52) U.S. Cl.
CPC .......... *H04W 72/1284* (2013.01); *H04L 1/00* (2013.01); *H04L 1/06* (2013.01); *H04L 1/16* (2013.01);
(Continued)

(58) Field of Classification Search
CPC ... H04L 5/0048; H04L 5/0055; H04L 1/1614; H04L 1/16; H04L 1/06; H04L 1/00; H04L 1/1621
See application file for complete search history.

(56) References Cited

U.S. PATENT DOCUMENTS

2007/0098100 A1* 5/2007 Charbit ............... H04L 27/2655
375/260
2010/0039926 A1* 2/2010 Zhang ................... H04L 1/1692
370/208
(Continued)

FOREIGN PATENT DOCUMENTS

CN 103973397 A 8/2014
CN 104938021 A 9/2015
(Continued)

OTHER PUBLICATIONS

Panasonic, "Implicit assignment of PHICH," 3GPP TSG-RAN WG1, R1-080976, Meeting #52, Feb. 11-15, 2008, 3 pages, 6.1.3, Sorrento, Italy.
(Continued)

*Primary Examiner* — Brian D Nguyen
(74) *Attorney, Agent, or Firm* — Slater Matsil, LLP

(57) ABSTRACT

This application discloses a grant-free transmission method, a network device, and a terminal device. The method includes: detecting, by a network device, a pilot sequence used by a terminal device for uplink transmission; determining, by the network device, a pilot sequence index of the pilot sequence based on the pilot sequence and a correspondence between the pilot sequence and the pilot sequence index; and sending, by the network device, information about a feedback result of the uplink transmission to the terminal device based on the pilot sequence index.

20 Claims, 8 Drawing Sheets

(51) Int. Cl.
*H04L 5/00* (2006.01)
*H04W 72/04* (2009.01)
*H04L 1/06* (2006.01)
*H04L 1/00* (2006.01)

(52) U.S. Cl.
CPC .......... *H04L 1/1614* (2013.01); *H04L 1/1621* (2013.01); *H04L 5/0048* (2013.01); *H04L 5/0055* (2013.01); *H04W 72/0413* (2013.01); *H04W 72/1268* (2013.01)

(56) References Cited

U.S. PATENT DOCUMENTS

| | | | |
|---|---|---|---|
| 2010/0316016 | A1 | 12/2010 | Kim et al. |
| 2011/0216722 | A1 | 9/2011 | Yang et al. |
| 2013/0148575 | A1 | 6/2013 | Wentink et al. |
| 2014/0254544 | A1 | 9/2014 | Kar Kin Au et al. |
| 2015/0215063 | A1* | 7/2015 | Kuchi .................... H04J 11/005 370/329 |
| 2015/0304090 | A1* | 10/2015 | Ko ......................... H04B 7/024 370/329 |
| 2016/0094327 | A1 | 3/2016 | Han et al. |
| 2016/0142898 | A1* | 5/2016 | Poitau .................. H04W 76/14 370/329 |
| 2017/0155487 | A1* | 6/2017 | Pelletier ................ H04L 5/0023 |
| 2017/0265217 | A1* | 9/2017 | Lomayev ................. H04B 7/04 |
| 2017/0338928 | A1* | 11/2017 | Park ...................... H04L 5/0048 |
| 2019/0305907 | A1* | 10/2019 | Qian ..................... H04L 5/0048 |

FOREIGN PATENT DOCUMENTS

| | | |
|---|---|---|
| CN | 106411475 A | 2/2017 |
| JP | 2011510586 A | 3/2011 |
| JP | 2014517627 A | 7/2014 |
| JP | 2014161049 A | 9/2014 |
| JP | 2016514416 A | 5/2016 |
| WO | 2009093816 A1 | 7/2009 |
| WO | 2012170583 A1 | 12/2012 |

OTHER PUBLICATIONS

LG Electronics, "Mapping Relations between UL VRB and DL ACK/NACK," 3GPP TSG RAN WG1#50, R1-073479, Aug. 20-24, 2007, 5 pages, 7.2.3, Athens, Greece.

"3rd Generation Partnership Project; Technical Specification Group Radio Access Network; Evolved Universal Terrestrial Radio Access (E-UTRA); Physical channels and modulation (Release 13)," 3GPP TS 36.211 V13.2.0 (Jun. 2016), 168 pages.

Samsung Electronics; "Discussions of Grant-Free Multiple Access in CIoT (Update of GPC150512)", 3GPP TSG GERAN1 Adhoc #3, GPC150521, 1.4.2.3, 1.4.2.5, 2.4.1.3, 2.4.1.5, Jun. 29-Jul. 2, 2015 10 pages, Kista Sweden.

* cited by examiner

GRANT-FREE TRANSMISSION METHOD, NETWORK DEVICE, AND TERMINAL DEVICE

CROSS-REFERENCE TO RELATED APPLICATIONS

This application is a continuation of International Application No. PCT/CN2017/098315, filed on Aug. 21, 2017, which claims priority to Chinese Patent Application No. 201610850117.8, filed on Sep. 26, 2016. The disclosures of the aforementioned applications are hereby incorporated by reference in their entireties.

TECHNICAL FIELD

This application relates to the communications field, and in particular, to a grant-free transmission method, a network device, and a terminal device in the communications field.

BACKGROUND

In a typical wireless communications network (for example, Long Term Evolution (LTE)), selection of uplink shared data channels is based on a scheduling/grant mechanism and completely controlled by a base station (BS). A complete data transmission process usually includes four steps: a scheduling request, a scheduling grant, data transmission, and transmission feedback. In this mechanism, user equipment (UE) first sends an uplink scheduling request to the BS; after receiving the request, the BS sends an uplink grant to the UE to notify the UE of an uplink transmission resource allocated to the UE; and then the UE performs data transmission on the granted uplink transmission resource accordingly.

Large-scale user access is one of typical application scenarios of a next-generation communications network. During massive user access, if the foregoing scheduling/grant mechanism is still used, huge signaling transmission overheads and BS resource allocation scheduling pressure are caused, and a significant transmission delay is also caused. In view of this, the next-generation communications network uses a grant-free transmission mode to support massive user access.

In a grant-free transmission mode, a base station does not schedule a transmission resource for user equipment. When a plurality of user equipments needs to simultaneously transmit data, the user equipments usually perform data transmission on a preconfigured common time-frequency resource in a contention-based manner. A grant-free transmission process may be simplified into two steps: data transmission and transmission feedback, thereby reducing signaling overheads and a transmission delay. In the grant-free transmission mode, the base station knows neither identification information of the user equipment nor information about a time-frequency resource occupied by the user equipment during data transmission. Therefore, the base station cannot perform feedback on the data transmission of the user equipment by using the feedback manner in the prior art. However, if a user identity is directly fed back to user equipment whose data is successfully decoded, to indicate that transmission succeeds, resource utilization efficiency may be reduced due to excessive bits occupied by the user identity.

Therefore, how to efficiently use radio transmission resources to perform feedback on grant-free transmission of user equipment is a problem that urgently needs to be resolved.

SUMMARY

In view of this, embodiments of this application provide a grant-free transmission method, a terminal device, and a network device, so as to efficiently use radio transmission resources to perform feedback on grant-free transmission of user equipment.

According to a first aspect, a grant-free transmission method is provided, where the method includes: detecting, by a network device, a pilot sequence used by a terminal device for uplink transmission; determining, by the network device, a pilot sequence index of the pilot sequence based on the pilot sequence and a correspondence between a pilot sequence and a pilot sequence index; and sending, by the network device, information about a feedback result of the uplink transmission to the terminal device based on the pilot sequence index.

Therefore, in this embodiment of this application, the network device indicates the feedback result of the current uplink transmission to the terminal device by using the pilot sequence index, so as to efficiently use radio transmission resources to perform feedback on grant-free transmission of user equipment.

Optionally, in an implementation of the first aspect, the sending, by the network device, information about a feedback result of the uplink transmission to the terminal device based on the pilot sequence index includes: determining, by the network device in a bitmap based on the pilot sequence index, a target bit position corresponding to the pilot sequence index, where each bit position in the bitmap corresponds to a different pilot sequence index; determining, by the network device, a value at the target bit position based on the feedback result, where the value at the target bit position is used to indicate that the feedback result is an acknowledgement (ACK) or a negative acknowledgement (NACK); and sending, by the network device, the bitmap to the terminal device.

In this embodiment, a length of a feedback information field depends on a quantity of pilot sequences, and the network device indicates a feedback result by using a fixed-length bitmap. Specifically, a value at a bit position in the bitmap is used to indicate a corresponding feedback result, so that radio transmission resources can be more efficiently used to perform feedback on grant-free transmission of user equipment, and this is easier to implement.

Optionally, for a pilot sequence that has not been detected by the network device, when a feedback result is indicated to the terminal device by using the bitmap, a value at a bit position corresponding to a pilot sequence index of the pilot sequence indicates that the feedback result is a NACK.

Optionally, in an implementation of the first aspect, a quantity of bit positions in the bitmap is greater than or equal to a quantity of pilot sequences that can be used for uplink transmission.

The quantity of bit positions in the bitmap is determined based on a quantity of pilot sequences that can be used for uplink transmission on a grant-free transmission resource, and may be determined by the network device or may be pre-agreed by the network device and the terminal device, for example, stipulated in a protocol.

Optionally, in an implementation of the first aspect, the sending, by the network device, the bitmap to the terminal device includes: sending, by the network device, downlink control information (DCI) carried on a physical downlink control channel to the terminal device, where the DCI includes the bitmap; or sending, by the network device, the bitmap carried on a physical downlink shared channel to the terminal device.

Optionally, in an implementation of the first aspect, the sending, by the network device, information about a feedback result of the uplink transmission to the terminal device based on the pilot sequence index includes: if the feedback result is an ACK, sending, by the network device, the pilot sequence index to the terminal device; or if the feedback result is a NACK, prohibiting, by the network device, sending the pilot sequence index to the terminal device.

In this embodiment, the network device implicitly indicates the feedback result by sending or not sending the pilot sequence index. The quantity of pilot sequences is far less than a quantity of user equipments, and a quantity of bits used to identify a pilot sequence index is far less than a quantity of bits used to identify a user identity. Therefore, compared with indicating the feedback result by using the user identity, this embodiment can reduce radio transmission resources that are used.

Optionally, in an implementation of the first aspect, a quantity of bit positions occupied by the pilot sequence index is determined based on a quantity of pilot sequences that can be used for uplink transmission.

Optionally, in an implementation of the first aspect, the sending, by the network device, the pilot sequence index to the terminal device includes: sending, by the network device, downlink control information (DCI) carried on a physical downlink control channel to the terminal device, where the DCI includes the pilot sequence index; or sending, by the network device, the pilot sequence index carried on a physical downlink shared channel to the terminal device.

Optionally, in an implementation of the first aspect, the method further includes: sending, by the network device, indication information to the terminal device, where the indication information is used to: instruct the terminal device to determine the feedback result based on the bitmap; or instruct the terminal device to determine the feedback result based on a receiving status of the pilot sequence index, where the receiving status includes that the terminal device has received the pilot sequence index or has not received the pilot sequence index.

Optionally, in an implementation of the first aspect, before the sending, by the network device, indication information to the terminal device, the method further includes: determining, by the network device, the indication information based on a quantity of terminal devices that simultaneously perform uplink transmission and the quantity of pilot sequences that can be used for uplink transmission.

For example, a total quantity of pilot sequence indexes that can be indicated by a quantity of bit positions occupied by the pilot sequence index should be greater than or equal to a total quantity of pilot sequences that can be used for uplink transmission, and a total quantity of bit positions in the bitmap should be greater than or equal to the total quantity of pilot sequences that can be used for uplink transmission. When a quantity of terminal devices that succeed in transmission exceeds a specific threshold, a total quantity of bits occupied by a plurality of pilot sequence indexes that need to be sent is greater than the total quantity of pilot sequences that can be used for uplink transmission, and in this case, the indication information may instruct the terminal device to determine the feedback result based on the bitmap; or when a quantity of terminal devices that succeed in transmission is less than a specific threshold, a total quantity of bits occupied by a plurality of pilot sequence indexes that need to be sent is less than the total quantity of pilot sequences that can be used for uplink transmission, and in this case, the indication information may instruct the terminal device to determine the feedback result based on the receiving status of the pilot sequence index.

Optionally, in an implementation of the first aspect, the method further includes: sending, by the network device, a transmission resource index to the terminal device, where the transmission resource index is used to indicate a location of a frequency domain resource used for the uplink transmission corresponding to the feedback result, and the location of the frequency domain resource is a location of the frequency domain resource in a plurality of frequency domain resources within a same time period.

Therefore, adding the transmission resource index to the feedback information can support simultaneous configuration of a plurality of uplink grant-free transmission resources within a same time period and effectively support simultaneous uplink grant-free transmission performed by the terminal device on a plurality of time-frequency resources.

According to a second aspect, a grant-free transmission method is provided, where the method includes: determining, by a terminal device based on a pilot sequence used for uplink transmission and a correspondence between a pilot sequence and a pilot sequence index, a pilot sequence index of the pilot sequence; receiving, by the terminal device, information that is about a feedback result of the uplink transmission and that is sent by a network device; and determining, by the terminal device, the feedback result of the uplink transmission based on the pilot sequence index and the information about the feedback result of the uplink transmission.

Therefore, in this embodiment of this application, the terminal device determines the feedback result, indicated by the network device, of the current uplink transmission by using the pilot sequence index, so as to efficiently use radio transmission resources to obtain feedback performed by the network device on grant-free transmission.

Optionally, in an implementation of the second aspect, the receiving, by the terminal device, information that is about a feedback result of the uplink transmission and that is sent by the network device includes: receiving, by the terminal device, a bitmap sent by the network device, where each bit position in the bitmap corresponds to a different pilot sequence index; and the determining, by the terminal device, the feedback result of the uplink transmission based on the pilot sequence index and the information about the feedback result of the uplink transmission includes: determining, by the terminal device in the bitmap based on the pilot sequence index, a target bit position corresponding to the pilot sequence index; and determining, by the terminal device, the feedback result based on a value at the target bit position, where the value at the target bit position is used to indicate that the feedback result is an acknowledgement (ACK) or a negative acknowledgement (NACK).

A quantity of bit positions in the bitmap is greater than or equal to a quantity of pilot sequences that can be used for uplink transmission.

Optionally, in an implementation of the second aspect, the receiving, by the terminal device, a bitmap sent by the network device includes: receiving, by the terminal device, downlink control information (DCI) carried on a physical downlink control channel and sent by the network device, where the DCI includes the bitmap; or receiving, by the terminal device, the bitmap carried on a physical downlink shared channel and sent by the network device.

Optionally, in an implementation of the second aspect, the determining, by the terminal device, the feedback result of the uplink transmission based on the pilot sequence index and the information about the feedback result of the uplink transmission includes: if the terminal device has received the pilot sequence index sent by the network device, determining, by the terminal device, that the feedback result is an ACK; or if the terminal device has not received the pilot sequence index sent by the network device, determining, by the terminal device, that the feedback result is a NACK.

Optionally, a quantity of bit positions occupied by the pilot sequence index is determined based on a quantity of pilot sequences that can be used for uplink transmission.

Optionally, in an implementation of the second aspect, the pilot sequence index is received by the terminal device through a physical downlink control channel, where DCI carried on the physical downlink control channel includes the pilot sequence index; or the pilot sequence index is received by the terminal device through a physical downlink shared channel.

Optionally, in an implementation of the second aspect, before the determining, by the terminal device, the feedback result, indicated by the network device, of the uplink transmission based on the pilot sequence index, the method further includes: receiving, by the terminal device, indication information sent by the network device, where the indication information is used to: instruct the terminal device to determine the feedback result based on the bitmap; or instruct the terminal device to determine the feedback result based on a receiving status of the pilot sequence index, where the receiving status includes that the terminal device has received the pilot sequence index or has not received the pilot sequence index; and the determining, by the terminal device, the feedback result, indicated by the network device, of the uplink transmission based on the pilot sequence index includes: determining, by the terminal device, the feedback result based on the indication information and the pilot sequence index.

Optionally, in an implementation of the second aspect, the method further includes: receiving, by the terminal device, a transmission resource index sent by the network device, where the transmission resource index is used to indicate a location of a frequency domain resource used for the uplink transmission corresponding to the feedback result, and the location of the frequency domain resource is a location of the frequency domain resource in a plurality of frequency domain resources within a same time period; and the determining, by the terminal device, the feedback result, indicated by the network device, of the uplink transmission based on the pilot sequence index includes: determining, by the terminal device, the feedback result based on the pilot index and the transmission resource index.

Therefore, adding the transmission resource index to the feedback information enables the terminal device to simultaneously perform uplink grant-free transmission on a plurality of time-frequency resources.

According to a third aspect, a network device is provided, where the network device may be configured to perform processes performed by the network device in the grant-free transmission method according to the first aspect and various implementations. The network device includes a processing unit and a sending unit. The processing unit is configured to detect a pilot sequence used by a terminal device for uplink transmission, and determine a pilot sequence index of the pilot sequence based on the pilot sequence and a correspondence between a pilot sequence and a pilot sequence index. The sending unit is configured to send information about a feedback result of the uplink transmission to the terminal device based on the pilot sequence index determined by the processing unit.

According to a fourth aspect, a terminal device is provided, where the terminal device may be configured to perform processes performed by the terminal device in the grant-free transmission method according to the second aspect and various implementations. The network device includes a processing unit and a receiving unit. The processing unit is configured to determine, based on a pilot sequence used for uplink transmission and a correspondence between a pilot sequence and a pilot sequence index, a pilot sequence index of the pilot sequence. The receiving unit is configured to receive information that is about a feedback result of the uplink transmission and that is sent by a network device. The processing unit is further configured to determine the feedback result of the uplink transmission based on the pilot sequence index determined by the processing unit and the information that is about the feedback result of the uplink transmission and that is received by the receiving unit.

According to a fifth aspect, a network device is provided, where the network device may be configured to perform processes performed by the network device in the grant-free transmission method according to the first aspect and various implementations. The network device includes a processor and a transmitter. The processor is configured to detect a pilot sequence used by a terminal device for uplink transmission, and determine a pilot sequence index of the pilot sequence based on the pilot sequence and a correspondence between a pilot sequence and a pilot sequence index. The transmitter is configured to send information about a feedback result of the uplink transmission to the terminal device based on the pilot sequence index determined by the processing unit.

According to a sixth aspect, a terminal device is provided, where the terminal device may be configured to perform processes performed by the terminal device in the grant-free transmission method according to the second aspect and various implementations. The terminal device includes a processor and a transmitter. The processor is configured to determine, based on a pilot sequence used for uplink transmission and a correspondence between a pilot sequence and a pilot sequence index, a pilot sequence index of the pilot sequence. The receiver is configured to receive information that is about a feedback result of the uplink transmission and that is sent by a network device. The processor is further configured to determine the feedback result of the uplink transmission based on the pilot sequence index determined by the processing unit and the information that is about the feedback result of the uplink transmission and that is received by the receiving unit.

According to a seventh aspect, a computer readable storage medium is provided, where the computer readable storage medium stores a program, and the program enables a network device to perform the grant-free transmission method according to any one of the first aspect or various implementations of the first aspect.

According to an eighth aspect, a computer readable storage medium is provided, where the computer readable storage medium stores a program, and the program enables a network device to perform the grant-free transmission method according to any one of the second aspect or various implementations of the second aspect.

According to the method described in the embodiments of this application, the feedback result of the current uplink transmission is indicated to the terminal device by using the pilot sequence index, so as to efficiently use radio transmission resources to perform feedback on grant-free transmission of user equipment.

DETAILED DESCRIPTION OF ILLUSTRATIVE EMBODIMENTS

Figure 1:
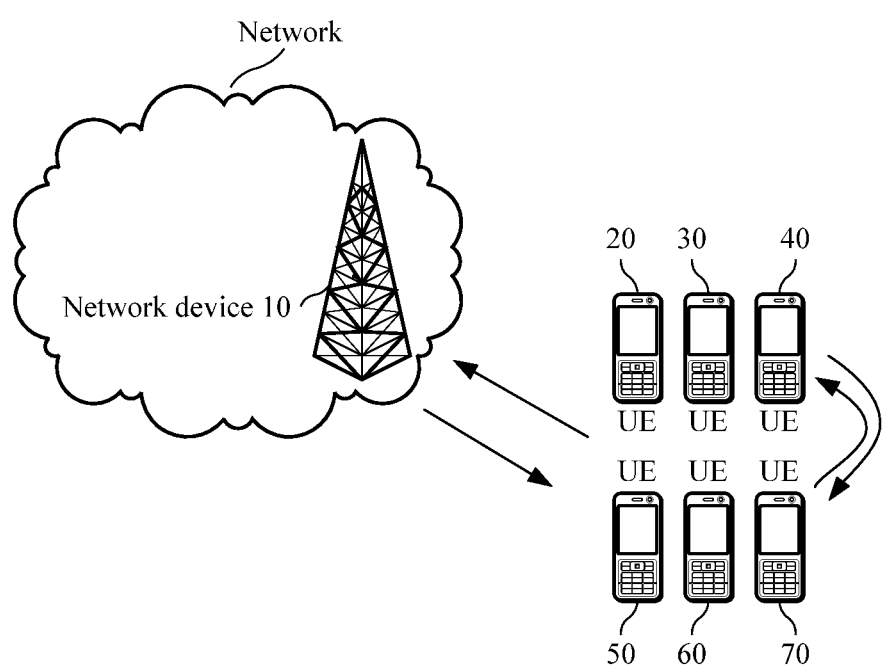
FIG. 1 is a schematic diagram of an application scenario according to an embodiment of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer readable media that store various data structures. For example, the components may perform communication by using a local and/or remote process and based on, for example, a signal having one or more data packets (for example, data from two components interacting with another component in a local system, a distributed system, and/or across a network such as the Internet interacting with other systems by using the signal).

The technical solutions in the embodiments of this application may be applied to various communications systems, such as a Global System for Mobile Communications (GSM) system, a Code Division Multiple Access (CDMA) system, a Wideband Code Division Multiple Access (WCDMA) system, a Long Term Evolution (LTE) system, an LTE frequency division duplex (FDD) system, an LTE time division duplex (TDD) system, a Universal Mobile Telecommunications System (UMTS), and a future 5G communications system.

This application describes the embodiments with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a future 5G network, a terminal device in a future evolved PLMN network, or the like.

This application describes the embodiments with reference to a network device. The network device may be a device configured to communicate with a terminal device. For example, the network device may be a base transceiver station (BTS) in a GSM system or a CDMA system, or a NodeB (NB) in a WCDMA system, or an evolved NodeB (eNB or eNodeB) in an LTE system, or the network device may be a relay station, an access point, an in-vehicle device, a wearable device, a network-side device in a future 5G network, a network device in a future evolved PLMN network, or the like.

Existence of massive connections makes a future wireless communications system highly different from an existing communications system. The massive connections need to consume more resources to access UE and consume more resources for transmission of scheduling signaling related to data transmission of a terminal device.

FIG. 1 is a schematic architectural diagram of a communications system according to an embodiment of this application. As shown in FIG. 1, the communications system may include a network device 10 and terminal devices 20 to 70 (UEs for short in FIG. 1). The network device 10 and the terminal devices 20 to 70 are connected in a wireless or wired manner or in another manner.

A network in this embodiment of this application may be a public land mobile network (PLMN), or a device-to-device (D2D) network, or a machine-to-machine/man (M2M) network, or another network. FIG. 1 is merely a simplified schematic diagram of an example. The network may further include another network device, which is not drawn in FIG. 1.

The solutions proposed in this application may be applied to grant-free transmission. Grant-free transmission can be applied to various services in a future network, for example, a machine type communication (MTC) service or an ultra-reliable and low latency communications (URLLC) service, so as to meet low-latency and high-reliability service transmission requirements. Grant-free transmission may be specific to uplink data transmission. Persons skilled in the art may know that grant-free transmission may also be referred to as another name, such as spontaneous access, spontaneous multiple access, or contention-based multiple access. Grant-free transmission may be understood as including but not limited to any one or more of the following meanings, or a combination of some technical features in the following meanings:

1. Grant-free transmission may be: a network device pre-allocates a plurality of transmission resources and notifies a terminal device of the transmission resources; when having an uplink data transmission requirement, the terminal device selects at least one transmission resource from the plurality of transmission resources pre-allocated by the network device, and sends uplink data by using the selected transmission resource; and the network device detects, on one or more of the plurality of pre-allocated transmission resources, the uplink data sent by the terminal device. The detection may be blind detection, or may be detection performed based on a control field in the uplink data, or may be detection performed in another manner.

2. Grant-free transmission may be: a network device pre-allocates a plurality of transmission resources and notifies a terminal device of the transmission resources, so that when having an uplink data transmission requirement, the terminal device selects at least one transmission resource from the plurality of transmission resources pre-allocated by the network device, and sends uplink data by using the selected transmission resource.

3. Grant-free transmission may be: obtaining information about a plurality of pre-allocated transmission resources; when having an uplink data transmission requirement, selecting at least one transmission resource from the plurality of transmission resources; and sending uplink data by using the selected transmission resource. An obtaining manner may be: obtaining from a network device.

4. Grant-free transmission may be: a method that can implement uplink data transmission of a terminal device without dynamic scheduling of a network device, where the dynamic scheduling may be a scheduling manner in which the network device indicates a transmission resource for each uplink data transmission of the terminal device by using signaling. Optionally, "without dynamic scheduling of a network device" may also be understood as static and/or semi-static scheduling. "A and/or B" in this embodiment of this application may represent A and B, or A, or B. Details are not described herein. Optionally, "implementing uplink data transmission of a terminal device" may be understood as "uplink data transmission for data of two or more terminal devices is allowed on a same time-frequency resource". Optionally, the transmission resource may be a transmission resource in one or more transmission time units after a moment at which the UE receives the signaling. One transmission time unit may be a smallest time unit of one transmission, for example, a transmission time interval (TI) whose value may be 1 ms, or may be a preset transmission time unit.

5. Grant-free transmission may be: a terminal device performs uplink data transmission without a grant from a network device. The grant may mean that, the terminal device sends an uplink scheduling request to the network device, and after receiving the scheduling request, the network device sends an uplink grant to the terminal device, where the uplink grant indicates an uplink transmission resource allocated to the terminal device.

6. Grant-free transmission may be: a contention-based transmission mode, which may specifically mean that a plurality of terminals simultaneously perform uplink data transmission on a same pre-allocated time-frequency resource without a grant from a base station.

The data may include service data or signaling data.

The blind detection may be understood as detection on possibly arrived data with no pre-knowledge of whether data arrives. The blind detection may also be understood as detection without an explicit signaling indication.

The transmission resource may include but is not limited to one or more combinations of the following resources: a time domain resource such as a radio frame, a subframe, or a symbol; a frequency domain resource such as a subcarrier or a resource block; a space domain resource such as a transmit antenna or a beam; a code domain resource such as a sparse code multiple access (SCMA) codebook group, a low density signature (LDS) group, or a CDMA code group; an uplink pilot resource; an interleaving resource; and a channel coding manner.

The foregoing transmission resource may be used for transmission performed based on the following control mechanisms, which include but are not limited to uplink power control, for example, uplink transmit power upper limit control; modulation and coding scheme setting, for example, setting of a transport block size, a bit rate, and a modulation order; and a retransmission mechanism, for example, a hybrid automatic repeat request (HARQ) mechanism.

Figure 2:
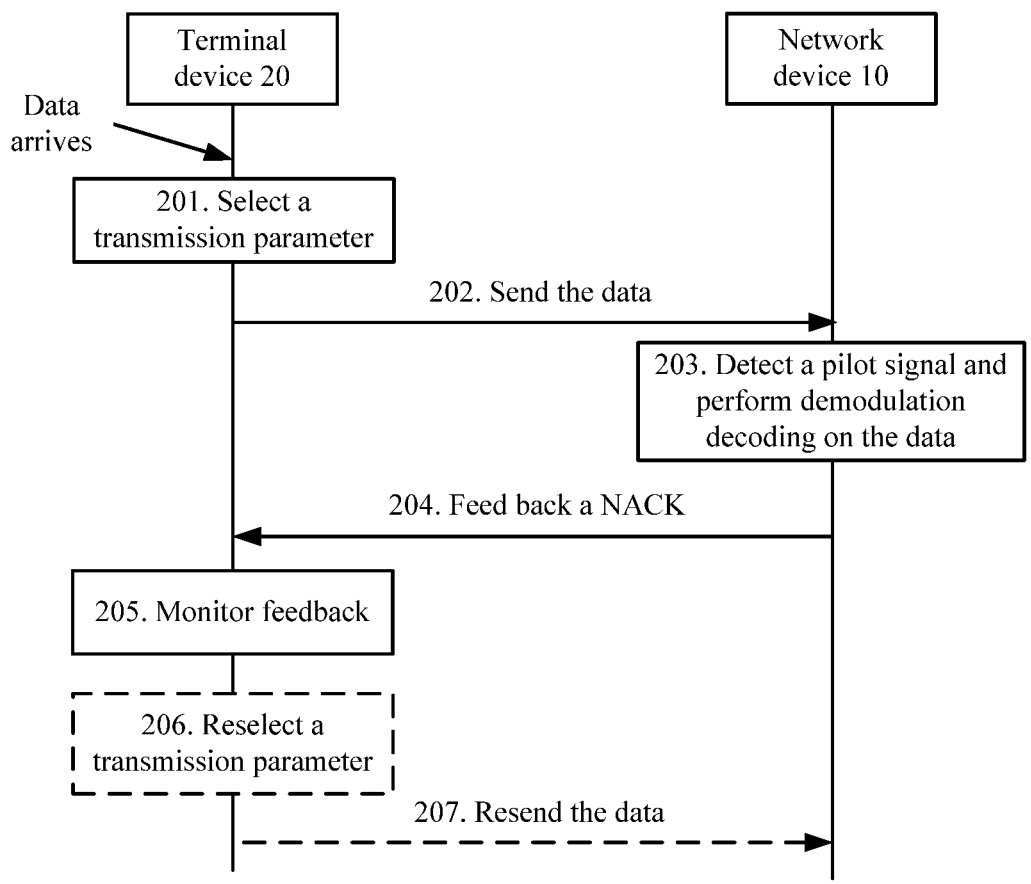
FIG. 2 is a schematic flowchart of uplink grant-free transmission including retransmission in the prior art.

FIG. 2 is a schematic flowchart of typical uplink grant-free transmission including retransmission. FIG. 2 shows a network device 10 and a terminal device 20, and grant-free transmission between the network device 10 and the terminal device 20 is used as an example for description. As shown in FIG. 2, a process of the uplink grant-free transmission including retransmission is as follows.

201. The terminal device 20 selects a transmission parameter, such as a pilot sequence, and obtains transmission information, such as a corresponding modulation and coding mode.

A feature of uplink grant-free transmission is that, before performing uplink grant-free transmission, the terminal device 20 first selects a pilot sequence, and performs uplink grant-free transmission on a configured uplink grant-free transmission time-frequency resource block based on transmission information indicated by the pilot sequence. It can be learned that, for transmission of each transport block, the terminal device may select a pilot sequence, where a manner of the selection may be random selection and/or selection performed according to a preset rule. Therefore, there is no binding relationship between the pilot sequence and the terminal device. However, during one transmission, one pilot may correspond to data transmission of one terminal device in a scenario of no pilot collision; or one pilot may correspond to data transmission of at least two terminal devices in a scenario of pilot collision.

202. The terminal device 20 sends uplink data.

The uplink data is sent on a specified physical uplink grant-free time-frequency resource after corresponding coding modulation processing based on the transmission information indicated by the pilot sequence.

203. The network device 10 detects a pilot signal, and performs demodulation decoding on the uplink data based on transmission information indicated by a detected pilot sequence. If decoding fails, step 204 is to be performed.

The network device 10 blindly detects the data sent by the terminal device 20. To be specific, the network device 10 first blindly detects a pilot signal; and after detecting the pilot sequence, the network device 10 performs demodulation decoding on the received uplink data based on the transmission information indicated by the pilot information.

204. The network device 10 sends a negative acknowledgement (NACK) to the terminal device 20.

205. The terminal device 20 monitors feedback of the network device 10.

If it is found that transmission fails, steps 206 and 207 are to be performed, that is, a transmission parameter is reselected, and retransmission is performed.

206. The terminal device 20 reselects a transmission parameter such as a pilot sequence, and obtains transmission information such as a corresponding modulation and coding mode.

207. The terminal device 20 resends the uplink data.

After receiving the data resent by the terminal device 20, the network device 10 performs combined decoding on the uplink data, and if the decoding succeeds, sends an acknowledgement (ACK) to the terminal device 20.

In an LTE system, when performing uplink data transmission, a plurality of terminal devices implement data separation between each other through orthogonality of time-frequency resources for data transmission. The network device uses 1 bit to perform feedback on whether transmission succeeds, and transmission feedback for the plurality of terminal devices may be mapped to a same group, which is identified, for example, by using a group number or an orthogonal sequence index. The group number and the orthogonal sequence index may be obtained through calculation by using parameters such as network-configured system bandwidth, a time-frequency resource index configured by the network device for terminal device transmission, and a pilot sequence shift.

In a grant-free transmission mode, when data simultaneously arrives at the plurality of terminal devices, because the network device does not schedule a transmission resource for the terminal devices, the terminal devices usually perform data transmission on a preconfigured common time-frequency resource in a contention-based manner. In the grant-free transmission mode, the network device knows neither identification information of the terminal device nor information about a time-frequency resource occupied by the terminal device during data transmission. Therefore, the network device cannot perform feedback on the data transmission of the terminal device by using the feedback manner in the prior art.

An easily figured-out feedback manner is to directly feed back a user identity to a terminal device whose data is successfully decoded, to indicate that transmission succeeds. However, such a method has a problem that resource utilization efficiency is low due to a relatively large quantity of bits of the user identity. For example, a 16-bit physical layer cell radio network temporary identifier (C-RNTI) is used. A C-RNTI is unique to a cell. However, with emergence of a future virtual cell or the like, a cell coverage area is far greater than a current cell coverage area, and a longer user identity is required to uniquely identify a user within a cell. Therefore, more transmission resources are occupied if the network device directly feeds back the user identity.

A HARQ feedback manner in a grant-free transmission process in an embodiment of this application can reduce transmission resources that are occupied, thereby saving transmission resources.

It should be understood that, the pilot signal in this embodiment of this application may also be referred to as a reference signal, which is a signal provided by a transmit end to a receive end for channel estimation, channel probing, or channel state detection. If there is a relatively small quantity of pilots, the pilots cannot be used to distinguish between all users, and the users need to share the pilots. In addition, when pilot collision occurs, a base station cannot perform accurate user detection and channel estimation and cannot successfully demodulate data.

It should be understood that in this embodiment of this application, an index of a pilot signal means that the pilot signal can be determined based on the index.

Optionally, in this embodiment of this application, the pilot signal may be directly determined based on the index, or the pilot signal may be determined based on the index in combination with other information. The index in this embodiment of this application may also be referred to as a number, a search parameter, or the like.

Figure 3:
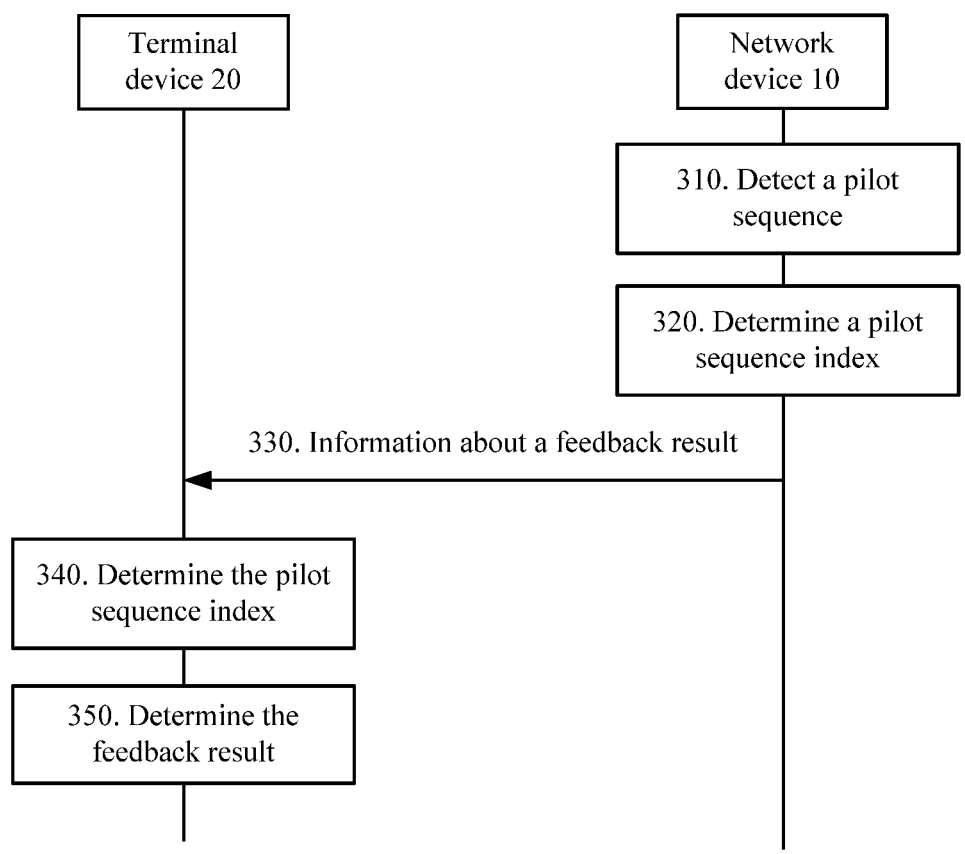
FIG. 3 is an interaction flowchart of a grant-free transmission method according to an embodiment of this application.

FIG. 3 is an interaction flowchart of a grant-free transmission method according to an embodiment of this application. In the method shown in FIG. 3, a transmit end of data and a pilot signal may be a terminal device or a network device, and a receive end of the data and the pilot signal may be a terminal device or a network device.

That a transmit end of data and a pilot signal is a terminal device and a receive end of the data and the pilot signal is a network device is used as an example for description below, but this embodiment of this application is not limited thereto. For example, a transmit end of data and a pilot signal is a terminal device, and a receive end of the data and the pilot signal is another terminal device. In this case, this embodiment of this application may be applied to D2D transmission.

FIG. 3 shows a network device 10 and a terminal device 20. However, the network device 10 may perform information transmission with a plurality of terminal devices including the terminal device 20 by using the method in this embodiment of this application. For a method performed by another terminal device, refer to a method performed by the terminal device 20. Details are not described herein for brevity. Optionally, the method may be applied to grant-free transmission or may be applied to another scenario. Herein, grant-free transmission is used as an example for description. In other words, uplink transmission performed by the terminal device 20 with the network device 10 is grant-free transmission, and a used transmission resource is a grant-free transmission resource. As shown in FIG. 3, the grant-free transmission method includes the following steps.

In step 310, the network device 10 detects a pilot sequence used by the terminal device 20 for uplink transmission.

Specifically, before performing uplink grant-free transmission, the terminal device 20 first selects a pilot sequence, and performs uplink grant-free transmission on a configured uplink grant-free transmission time-frequency resource block based on transmission information indicated by the pilot sequence. The uplink data may be sent on a specified physical uplink grant-free time-frequency resource after corresponding coding modulation processing is performed based on the transmission information indicated by the pilot sequence. The network device 10 blindly detects the uplink data sent by the terminal device 20. To be specific, the network device 10 first blindly detects a pilot; and after detecting the pilot sequence, the network device 10 performs demodulation decoding on the uplink data based on the transmission information indicated by the pilot information. Usually, a probability of pilot detection success is far higher than a probability of data decoding success. Therefore, a pilot sequence is usually easily detected and can be detected even when there is collision, but data decoding may fail due to pilot collision or poor channel quality.

For transmission on a grant-free transmission time-frequency resource block, each terminal device may select a pilot sequence, where the selection may be random selection and/or selection performed according to a preset rule. Therefore, there is no binding relationship between the pilot sequence and the terminal device. However, during one transmission, one pilot sequence may correspond to uplink transmission of one terminal device in a scenario of no pilot collision; or one pilot sequence may correspond to uplink transmission of two or more terminal devices in a scenario of pilot collision.

In step 320, the network device 10 determines a pilot sequence index of the pilot sequence based on the pilot sequence and a correspondence between the pilot sequence and the pilot sequence index.

Specifically, after detecting the pilot sequence used by the terminal device 20 for uplink transmission, the network device 10 may determine the pilot sequence index of the pilot sequence based on the correspondence between the pilot sequence and the pilot sequence index. The correspondence between a pilot sequence and a pilot sequence index may be determined by the terminal device 20 itself based on a pilot sequence that can be used for uplink transmission on a grant-free transmission resource, and then notified to the network device 10; or may be determined by the network device 10 and then notified to the terminal device 20; or may be pre-agreed by the network device 10 and the terminal device 20, for example, stipulated in a protocol. The network device 10 and the terminal device 20 maintain a same correspondence between a pilot sequence and a pilot sequence index, for example, a correspondence between a pilot sequence and a pilot sequence index shown in Table 1. A pilot sequence index is in a one-to-one correspondence with a pilot sequence, and each pilot sequence index uniquely indicates one pilot sequence. For example, a pilot sequence index 0 corresponds to a pilot sequence 0, a pilot sequence index 1 corresponds to a pilot sequence 1, and by analogy, a pilot sequence index 1 corresponds to a pilot sequence i.

TABLE 1

| Pilot sequence index | Pilot sequence |
|---|---|
| Index 0 | Sequence 0 |
| Index 1 | Sequence 1 |
| ... | ... |
| Index i | Sequence i |
| ... | ... |

In step 330, the network device 10 sends information about a feedback result of the uplink transmission to the terminal device 20 based on the pilot sequence index.

Specifically, the terminal device 20 and the network device 10 maintain the same correspondence between a pilot sequence and a pilot sequence index, so that the network device 10 may indicate the feedback result of the uplink transmission to the terminal device 20 based on the pilot sequence index corresponding to the detected pilot sequence. For example, the feedback result may be an acknowledgement (ACK), indicating that the uplink transmission succeeds, that is, the network device 10 successfully decodes, based on the detected pilot sequence of the terminal device 20, the uplink data sent by the terminal device 20; alternatively, the feedback result may be a negative acknowledgement (NACK), indicating that the uplink transmission fails. For example, the network device 10 has not detected the pilot sequence of the terminal device 20; or the network device 10 has detected the pilot sequence but fails to decode, based on the pilot sequence, the data sent by the terminal device 20.

Therefore, in this embodiment of this application, the feedback result of the current uplink transmission is indicated to the terminal device by using the pilot sequence index, so as to efficiently use radio transmission resources to perform feedback on grant-free transmission of user equipment.

In this embodiment of this application, the network device 10 may indicate the feedback result of the uplink transmission to the terminal device 20 in two manners. One manner is that the network device 10 indicates the feedback result at a location of the corresponding pilot sequence index by using a bitmap, and the other manner is that the network device 10 directly indicates the feedback result by using the pilot sequence index. It should be understood that the bitmap in this embodiment of this application may also be referred to as a bit array, a bitmap index, or the like.

Figure 4:
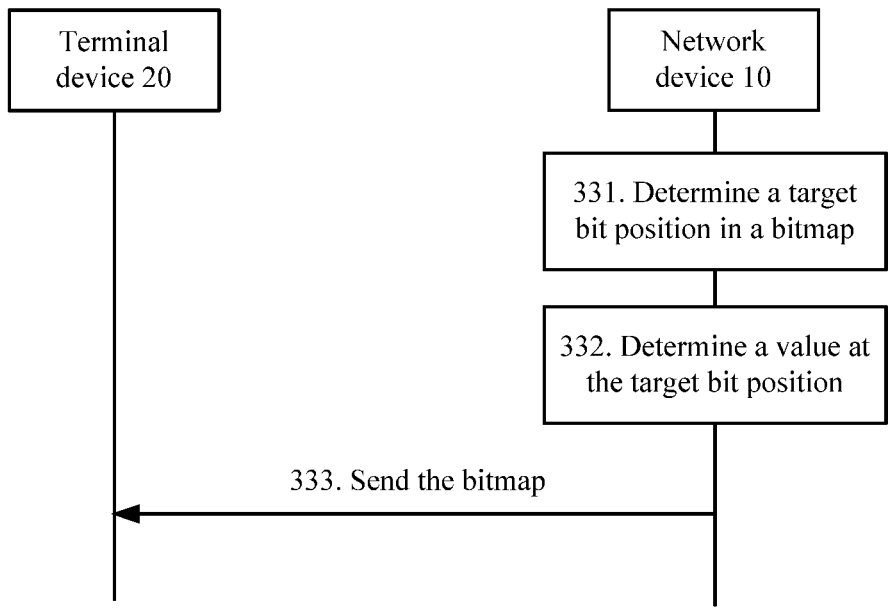
FIG. 4 is an interaction flowchart of a grant-free transmission method according to another embodiment of this application.

With reference to FIG. 4, the following describes in detail how the network device 10 indicates the feedback result of the uplink transmission in the two manners.

FIG. 4 is an interaction flowchart of a grant-free transmission method according to another embodiment of this application. As shown in FIG. 4, the network device 10 indicates the feedback result to the terminal device 20 by using a bitmap, and step 330 may be replaced with steps 331 to 333.

In step 331, the network device 10 determines, in a bitmap based on the pilot sequence index, a target bit position corresponding to the pilot sequence index.

Each bit position in the bitmap corresponds to a different pilot sequence index.

Specifically, the network device 10 first performs pilot detection for the uplink grant-free transmission, then performs demodulation decoding to obtain a feedback result, and indicates, to the terminal device 20 at a location of the corresponding pilot sequence index by using the bitmap, a decoding result of the uplink data sent by the terminal device 20. Each bit position in the bitmap corresponds to a different pilot sequence index, and each pilot sequence index is in a one-to-one correspondence with each bit position in the bitmap. After determining the pilot sequence index corresponding to the pilot sequence of the uplink transmission, the network device 10 may determine, based on a correspondence between the pilot sequence index and a bit position in the bitmap, the target bit position corresponding to the pilot sequence index.

Optionally, the quantity of bit positions in the bitmap is determined based on a quantity of pilot sequences that can be used for uplink transmission on the grant-free transmission resource, and may be determined by the network device 10 or may be pre-agreed by the network device 10 and the terminal device 20, for example, stipulated in a protocol.

Further, a quantity of bit positions in the bitmap needs to be greater than or equal to the quantity of pilot sequences that can be used for uplink transmission.

In step 332, the network device 10 determines a value at the target bit position based on the feedback result.

The value at the target bit position is used to indicate that the feedback result is an acknowledgement (ACK) or a negative acknowledgement (NACK).

Specifically, if the network device 10 successfully decodes, based on the detected pilot sequence of the terminal device 20, the uplink data sent by the terminal device 20, the network device 10 needs to indicate a feedback result indicating that transmission succeeds to the terminal device 20, for example, feeds back an ACK to the terminal device 20; or if the network device 10 has not detected the pilot sequence of the terminal device 20, or has detected the pilot sequence but fails to decode the uplink data based on the pilot sequence, the network device 10 needs to indicate a feedback result indicating that transmission fails to the terminal device 20, for example, feeds back a NACK to the terminal device 20. In this case, if an ACK needs to be fed back, the network device 10 may determine a location of the pilot sequence index in the bitmap, namely, the target bit position corresponding to the pilot sequence index, based on the pilot sequence index corresponding to the pilot sequence used by the terminal device 20 for the uplink transmission, and set the value at the target bit position to 1 to indicate that the feedback result is an ACK; or if a NACK needs to be fed back, the network device 10 sets the value at the target bit position to 0 to indicate that the feedback result is a NACK. It should be understood that alternatively, 0 may be used herein to indicate that the feedback result is a NACK, and 1 is used to indicate that the feedback result is an ACK.

In step 333, the network device 10 sends the bitmap to the terminal device 20.

Optionally, that the network device 10 sends the bitmap to the terminal device 20 includes: sending, by the network device 10, downlink control information (DCI) carried on a physical downlink control channel to the terminal device 20, where the DCI includes the bitmap; or sending, by the network device 10, the bitmap carried on a physical downlink shared channel to the terminal device 20.

Specifically, the network device 10 may generate DCI, where the DCI includes the bitmap. A DCI format of the DCI may be designed as a format corresponding to such control information, namely, the bitmap. The DCI may be carried on a normal physical downlink control channel (PDCCH), or may be carried on an enhanced physical downlink control channel (EPDCCH), a machine type communication (MTC) physical downlink control channel (MPDCCH), a narrowband physical downlink control channel (NBPDCCH), and a newly designed physical downlink control channel (XX-PDCCH) in the future.

Alternatively, the network device 10 may generate a transport block, to send the bitmap, where the bitmap may be carried on a typical physical downlink shared channel (PDSCH) or a newly designed physical downlink shared channel in the future. In this case, the bitmap is transmitted as data, and one downlink transmission is indicated by a legacy DCI format.

It should be understood that the feedback result indicated by the network device 10 to the terminal device 20 includes feedback results of many uplink transmissions, that is, each bit position in the bitmap carries an indication of a feedback result of a different uplink transmission. In this case, a cyclic redundancy check (CRC) for the DCI may be scrambled by using a general grant-free radio network temporary identifier (GF-RNTI).

With reference to Table 2, a detailed example is used below to describe how the feedback result is indicated in this manner, that is, by using a bitmap. Table 2 shows a bitmap. That there are 96 pilot sequences that can be used for uplink transmission on an uplink grant-free transmission time-frequency resource is used as an example for description. In this case, there are also 96 pilot sequence indexes, which correspond to the 96 pilot sequences, respectively.

The bitmap used to indicate the feedback result requires at least 96 bits, that is, 12 bytes. The 96 bits are in a one-to-one correspondence with the foregoing 96 pilot sequence indexes. In the bitmap, it may be defined that the least significant bit, for example, the zeroth bit corresponds to a pilot sequence index 0, the first bit corresponds to a pilot sequence index 1, and by analogy, the ninety-fifth bit corresponds to a pilot sequence index 95. For example, in the bitmap shown in Table 2, from right to left are the zeroth bit, the first bit, the second bit, . . . , and the seventh bit in the first row, the eighth bit, the ninth bit, the tenth bit, . . . , and the fifteenth bit in the second row, and so on.

The feedback result indicated by the network device 10 may use 0 to indicate that transmission fails (the feedback result is a NACK) and use 1 to indicate that transmission succeeds (the feedback result is an ACK). Assuming that the terminal device 20 performs uplink transmission by using a pilot sequence 0, which corresponds to a pilot sequence index 0, when the network device 10 detects that the terminal device 20 using the pilot sequence index 0 has uplink transmission, but the uplink data sent by the terminal device 20 fails to be decoded due to poor channel quality or pilot collision, the network device 10 sets a value at the zeroth bit position in the bitmap to 0, indicating that data transmission fails. Assuming that the terminal device 20 performs uplink transmission by using a pilot sequence 1, which corresponds to a pilot sequence index 1, when the network device 10 detects that the terminal device 20 using the pilot sequence index 1 has uplink transmission and successfully decodes user data, the network device 10 sets a value at the first bit position in the bitmap to 1, indicating that data transmission succeeds. Details are shown in Table 2.

TABLE 2

| 0 | 1 | 1 | 0 | 0 | 1 | 1 | 0 |
|---|---|---|---|---|---|---|---|
| 1 | 1 | 1 | 0 | 1 | 1 | 0 | 0 |
|   |   |   | . . . |   |   |   |   |
| 1 | 0 | 0 | 1 | 0 | 1 | 1 | 1 |

For a scenario in which the network device 10 has not detected a pilot sequence, it is possible that this pilot sequence is not selected by the terminal device during current sending, or that the pilot sequence itself has not been detected. When indicating the feedback result, the network device 10 has not obtained pilot sequence information, and values at all bit positions corresponding to pilot sequence indexes of these pilot sequences are set to 0.

In this embodiment, a length of a feedback information field depends on a quantity of pilot sequences, and the network device indicates a feedback result by using a fixed-length bitmap. Specifically, a value at a bit position in the bitmap is used to indicate a corresponding feedback result, so that radio transmission resources can be more efficiently used to perform feedback on grant-free transmission of user equipment, and this is easier to implement.

The other feedback result indication manner proposed in this application is to directly indicate the feedback result by using the pilot sequence index. Details are described below.

In another embodiment, that the network device 10 indicates the feedback result of the uplink transmission to the terminal device 20 based on the pilot sequence index includes: if the feedback result is an ACK, sending, by the network device 10, the pilot sequence index to the terminal device 20; or if the feedback result is a NACK, prohibiting, by the network device 10, sending the pilot sequence index to the terminal device 20.

Specifically, the network device 10 may directly indicate the feedback result of the uplink transmission by sending the pilot sequence index. When the uplink transmission of the terminal device 20 succeeds, the network device 10 determines, based on the detected pilot sequence selected by the terminal device 20, the pilot sequence index corresponding to the pilot sequence, and directly sends the pilot sequence index to the terminal device 20, to indicate that the feedback result is an ACK. When the transmission fails, the network device 10 does not send the pilot sequence index to the terminal device 20, thereby implicitly indicating that the feedback result is a NACK.

Optionally, a quantity of bit positions occupied by the pilot sequence index is determined based on the quantity of pilot sequences that can be used for uplink transmission.

Still using the 96 pilot sequences as an example for description, because 96 is between 26 and 27, bit positions occupied by the pilot sequence index may be set to 7 bits herein, where 7 bits can indicate a maximum of 128 numbers. Therefore, the 7 bits may be used to indicate the pilot sequence index.

With reference to Table 3, a detailed example is used below to describe how the feedback result is indicated in this manner, that is, by sending the pilot sequence index. Table 3 shows pilot sequence indexes of all current terminal devices that succeed in transmission. That a quantity of bit positions occupied by the pilot sequence index is 7 and each pilot sequence index is arranged row-wise, which is used as an example for description.

Assuming that the terminal device 20 performs uplink transmission by using a pilot sequence 0, which corresponds to a pilot sequence index 0, if the network device 10 successfully decodes the uplink data, the network device 10 sends the pilot sequence index 0 to the terminal device 20, indicating that data transmission succeeds. The pilot sequence index 0 includes 7 bits, namely, 0000000. Therefore, as shown in the first row in Table 3, the pilot sequence index 0000000 is sent to the terminal device 20.

If the network device 10 detects that the terminal device 20 using the pilot sequence index 0 has uplink transmission, but the uplink data sent by the terminal device 20 fails to be decoded due to poor channel quality, pilot collision, or the like, the network device 10 does not send the pilot sequence index 0 to the terminal device 20, thereby indicating, to the terminal device 20, that data transmission fails. The pilot sequence indexes, shown in Table 3, that are sent by the network device 10 and are of all the terminal devices that succeed in transmission, do not include the pilot sequence index 0.

TABLE 3

| 0 | 0 | 0 | 0 | 0 | 0 | 0 | 0 |
| 0 | 0 | 0 | 0 | 0 | 0 | 1 | 1 |
| 0 | 0 | 0 | 1 | 0 | 1 | 1 | 1 |
| ... | | | | | | | |
| 0 | 1 | 1 | 1 | 0 | 1 | 0 | 0 |

Optionally, the sending, by the network device 10, the pilot sequence index to the terminal device 20 includes: sending, by the network device 10, downlink control information (DCI) carried on a physical downlink control channel to the terminal device 20, where the DCI includes the pilot sequence index; or sending, by the network device 10, the pilot sequence index carried on a physical downlink shared channel to the terminal device 20.

In this embodiment, the network device implicitly indicates the feedback result by sending or not sending the pilot sequence index. The quantity of pilot sequences is far less than a quantity of user equipments, and a quantity of bits used to identify a pilot sequence index is far less than a quantity of bits used to identify a user identity. Therefore, compared with indicating the feedback result by using the user identity, this embodiment can reduce radio transmission resources that are used.

In step 340, the terminal device 20 determines, based on the pilot sequence used for uplink transmission and the correspondence between the pilot sequence and a pilot sequence index, the pilot sequence index of the pilot sequence.

Specifically, the terminal device 20 selects the pilot sequence and performs uplink grant-free transmission on a configured uplink grant-free transmission time-frequency resource block based on transmission information indicated by the pilot sequence. After sending the uplink data, the terminal device 20 waits for a transmission result fed back by the network device. The terminal device 20 may determine the pilot sequence index of the pilot sequence based on the correspondence between a pilot sequence and the pilot sequence index, and after receiving an indication of the feedback result from the network device, determines the feedback result based on the pilot sequence index. The correspondence between a pilot sequence and a pilot sequence index may be determined by the terminal device 20 itself based on a pilot sequence that can be used for uplink transmission on a grant-free transmission resource, and then notified to the network device 10; or may be determined by the network device 10 and then notified to the terminal device 20; or may be pre-agreed by the network device 10 and the terminal device 20, for example, stipulated in a protocol. The network device 10 and the terminal device 20 maintain a same correspondence between a pilot sequence and a pilot sequence index.

In step 350, the terminal device 20 determines the feedback result, indicated by the network device 10, of the uplink transmission based on the pilot sequence index.

Specifically, the terminal device 20 and the network device 10 maintain the same correspondence between a pilot sequence and a pilot sequence index, and the terminal device 20 determines the feedback result, indicated by the network device 10, of the uplink transmission based on the pilot sequence index corresponding to the pilot sequence used for sending the uplink data. For example, the feedback result may be an acknowledgement ACK, indicating that the uplink transmission succeeds; or the feedback result may be a negative acknowledgement NACK, indicating that the uplink transmission fails. The terminal device 20 needs to perform retransmission on data that fails to be transmitted.

Likewise, the terminal device 20 may also determine the feedback result, indicated by the network device 10, of the uplink transmission in the foregoing two manners. One manner is that the terminal device 20 determines the feedback result, indicated by the network device 10, of the uplink transmission based on the bitmap sent by the network device 10, and the other manner is that the terminal device 20 determines the feedback result based on the pilot sequence index sent by the network device 10. The following describes in detail how the terminal device 20 determines the feedback result, indicated by the network device 10, of the uplink transmission.

Figure 5:
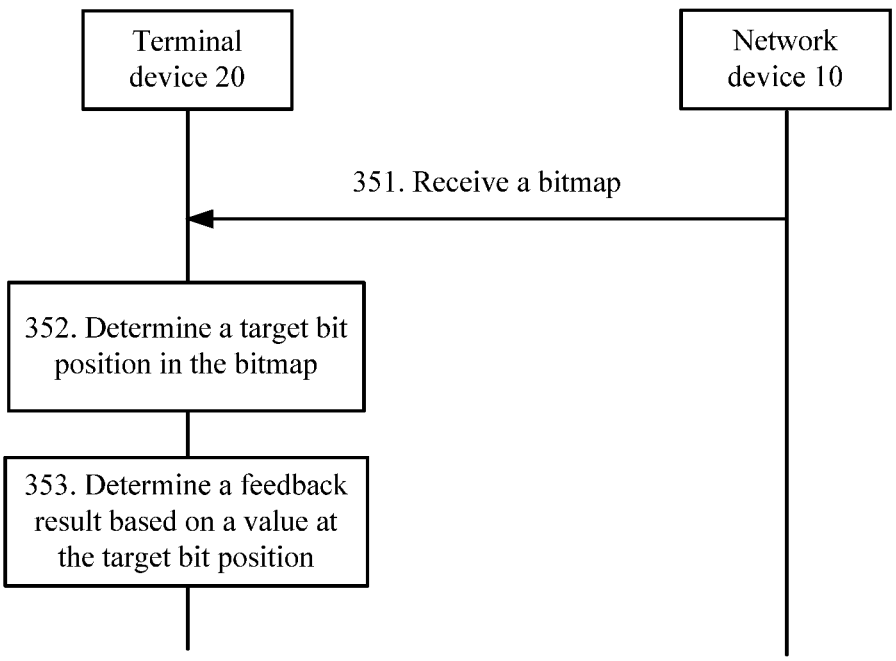
FIG. 5 is an interaction flowchart of a grant-free transmission method according to another embodiment of this application.

FIG. 5 is an interaction flowchart of a grant-free transmission method according to another embodiment of this application. As shown in FIG. 5, the terminal device 20 determines, based on the bitmap sent by the network device 10, the feedback result indicated by the network device 10. Before step 350, the method may further include step 351. In this case, step 350 may be replaced with steps 352 and 353.

In step 351, the terminal device 20 receives the bitmap sent by the network device 10.

Each bit position in the bitmap corresponds to a different pilot sequence index.

Optionally, that the terminal device 20 receives the bitmap sent by the network device 10 includes: receiving, by the terminal device 20, downlink control information (DCI) carried on a physical downlink control channel and sent by the network device 10, where the DCI includes the bitmap; or receiving, by the terminal device 20, the bitmap carried on a physical downlink shared channel and sent by the network device 10.

Specifically, the DCI received by the terminal device 20 may be carried on a PDCCH, or may be carried on an enhanced physical downlink control channel (EPDCCH), a machine type communication physical downlink control channel (MPDCCH), a narrowband physical downlink control channel (NBPDCCH), and a newly designed physical downlink control channel (XX-PDCCH) in the future.

Alternatively, the bitmap received by the terminal device 20 may be carried on a normal physical downlink shared channel (PDSCH) or a newly designed physical downlink shared channel in the future. In this case, the bitmap received by the terminal device 20 is equivalent to downlink data, and the downlink transmission is indicated by a legacy DCI format.

In step 352, the terminal device 20 determines, in the bitmap based on the pilot sequence index, a target bit position corresponding to the pilot sequence index.

Specifically, after the terminal device 20 receives the bitmap, each bit position in the bitmap corresponds to a different pilot sequence index, and each pilot sequence index is in a one-to-one correspondence with each bit position in the bitmap. After determining the pilot sequence index corresponding to the pilot sequence of the uplink transmission, the terminal device 20 may determine, based on a correspondence between the pilot sequence index and a bit position in the bitmap, the target bit position corresponding to the pilot sequence index.

In step 353, the terminal device 20 determines the feedback result based on a value at the target bit position.

The value at the target bit position is used to indicate that the feedback result is an ACK or a NACK.

Specifically, after determining the target bit position corresponding to the pilot sequence index in the received bitmap based on the pilot sequence index of the terminal device 20, the terminal device 20 determines the value at the target bit position. The value at the target bit position indicates the feedback result. For example, if the value at the target bit position is 1, the terminal device 20 determines that the feedback result is an ACK, indicating that the uplink transmission succeeds; or if the value at the target bit position is 0, the terminal device 20 determines that the feedback result is a NACK, indicating that the uplink transmission fails, and necessary retransmission is required. It should be understood that alternatively, in the bitmap, 0 may be used herein to indicate that the feedback result is a NACK, and 1 is used to indicate that the feedback result is an ACK.

Herein, that there are 96 pilot sequences that can be used for uplink transmission on an uplink grant-free transmission time-frequency resource is still used as an example for description. As shown in Table 2 above, after determining the pilot sequence index of the pilot sequence used for transmitting the uplink data, the terminal device 20 determines the target bit position corresponding to the pilot sequence index in the 96 bit positions in the bitmap sent by the network device 10. Assuming that the terminal device 20 performs uplink transmission by using a pilot sequence 0, which corresponds to a pilot sequence index 0, the terminal device 20 determines a value at the zeroth bit position in the bitmap. As shown in Table 2, the value at the zeroth bit position is 0, and the terminal device 20 determines that the feedback information indicated by the network device 10 is a NACK, indicating that data transmission fails, and retransmission is required. Assuming that the terminal device 20 performs uplink transmission by using a pilot sequence 1, which corresponds to a pilot sequence index 1, the terminal device 20 determines a value at the first bit position in the bitmap. As shown in Table 2, the value at the first bit position is 1, and the terminal device 20 determines that the feedback information indicated by the network device 10 is an ACK, indicating that data transmission succeeds.

In this embodiment, a length of a feedback information field depends on a quantity of pilot sequences, and the terminal device determines the feedback result by using a bitmap, so that radio transmission resources can be efficiently used, and this is easier to implement.

In step 350, the terminal device 20 may determine the feedback result in another manner, that is, the terminal device 20 directly determines the feedback result based on a receiving status of the pilot sequence index. Details are described below.

In another embodiment, that the terminal device 20 determines the feedback result, indicated by the network device 10, of the uplink transmission based on the pilot sequence index includes: if the terminal device 20 has received the pilot sequence index sent by the network device 10, determining, by the terminal device 20, that the feedback result is an ACK; or if the terminal device 20 has not received the pilot sequence index sent by the network device 10, determining, by the terminal device 20, that the feedback result is a NACK.

Specifically, the terminal device 20 may determine the feedback result based on the receiving status of the pilot sequence index, where the receiving status may include that the terminal device 20 has received the pilot sequence index or has not received the pilot sequence index. When the uplink transmission of the terminal device 20 succeeds, the network device 10 directly sends the corresponding pilot sequence index to the terminal device 20, to indicate that the feedback result is an ACK. When the transmission fails, the network device 10 does not send the pilot sequence index to the terminal device 20, thereby implicitly indicating that the feedback result is a NACK. Therefore, if the terminal device 20 has received the pilot sequence index of the terminal device 20, it is considered that the network device 10 feeds back an ACK and the uplink transmission succeeds, and the terminal device 20 may continue to transmit new uplink data; or if the terminal device 20 has not received the pilot sequence of the terminal device 20, it is considered that the network device 10 feeds back a NACK and the uplink transmission fails, and the terminal device 20 performs necessary retransmission.

Optionally, the pilot sequence index is received by the terminal device 20 through a physical downlink control channel, where DCI carried on the physical downlink control channel includes the pilot sequence index; or the pilot sequence index is received by the terminal device 20 through a physical downlink shared channel.

In this embodiment, the network device implicitly indicates the feedback result by sending or not sending the pilot sequence index, and the terminal device can obtain the feedback result of the uplink transmission only by determining whether the terminal device has received the pilot sequence index. The quantity of pilot sequences is far less than a quantity of user equipments, and a quantity of bits used to identify a pilot sequence index is far less than a quantity of bits used to identify a user identity. Therefore, compared with determining, based on the user identity, the feedback result indicated by the network device, this embodiment can reduce radio transmission resources that are used.

It should be noted that when the network device 10 sends the bitmap, only 96 bits are required to indicate feedback results of uplink transmission of a maximum of 96 terminal devices. In this case, a common scrambling sequence may be used to scramble information about the bitmap. A plurality of terminal devices descramble the information about the bitmap by using a same sequence. After descrambling, each terminal device obtains the information about the bitmap, finds a respective target bit position in the bitmap, and receives a value at the target bit position indicating the feedback result. In this embodiment of this application, that the terminal device receives the bitmap may mean that after obtaining the bitmap, the terminal device receives the feedback information at the target bit position. That the terminal device receives the pilot sequence index may also mean that a pilot sequence index corresponding to the pilot sequence of the terminal device in a plurality of pilot sequence indexes is received. For details, refer to a process of receiving the value at the target bit position, and details are not described herein.

When sending the pilot sequence index according to the foregoing scrambling manner to indicate the feedback information, the network device 10 may simultaneously send, on a transmission resource, pilot sequence indexes of a plurality of terminal devices that succeed in transmission, for example, as shown in the case of Table 3.

In the aforementioned grant-free transmission method in this embodiment of this application, the different manners in which the network device indicates the feedback result of the uplink transmission to the terminal device are described separately. In the two methods for implementing efficient ACK/NACK feedback, from a perspective of efficient utilization of radio transmission resources, the first manner (indicating the feedback result by using the bitmap) may save more radio resources than the second manner (indicating the feedback result by sending or nor sending the pilot index) in some scenarios, while the second manner may save more radio resources than the first manner in some other scenarios.

That there are 96 pilot sequences that can be used for uplink transmission on a grant-free transmission resource is still used as an example for description. If 7 bits are used to feed back the pilot sequence index, when there are more than 13 terminal devices that require feedback, more than 96 bits are required to indicate the feedback result. In this case, more radio resources are occupied when the network device indicates the feedback result by sending the pilot sequence index than when the network device indicates the feedback result by using the bitmap. Conversely, when no more than 13 terminal devices require feedback, fewer radio resources are occupied when the feedback result is indicated by sending the pilot sequence index than when the feedback result is indicated by using the bitmap.

To implement efficient utilization of downlink transmission resources when the network device indicates the feedback result, a feedback manner of uplink grant-free transmission may be adaptively determined and indicated to the terminal device based on a quantity of terminal devices whose data is successfully decoded and a quantity of pilot sequences that can be used for uplink transmission. For example, 1 bit is used for an indication, with 0 indicating that the terminal device determines the feedback result based on the bitmap, and 1 indicating that the terminal device determines the feedback result based on the receiving status of the pilot sequence index.

In another embodiment, the method further includes: sending, by the network device 10, indication information to the terminal device 20, where content indicated by the indication information includes: instructing the terminal device 20 to determine the feedback result based on the bitmap; or instructing the terminal device 20 to determine the feedback result based on a receiving status of the pilot sequence index, where the receiving status includes that the terminal device 20 has received the pilot sequence index or has not received the pilot sequence index.

Specifically, to minimize transmission resources that are used when the network device 10 indicates the feedback result, the network device 10 may send the indication information to the terminal device 20, to indicate which of the two feedback methods is used in current transmission feedback.

In this embodiment, two indication manners may be used by the network device 10 to indicate, to the terminal device 20, a feedback result indication manner used in uplink grant-free transmission.

Manner 1:

Long-period indication, that is, the network device 10 instructs, based on a specific time period, the terminal device 20 to use a fixed manner within the time period to determine the feedback result indicated by the network device 10.

That there are 96 pilot sequences that can be used for uplink transmission on a grant-free transmission resource is still used as an example for description. If the network device 10 finds that within a period of time, only far less than 13 terminal devices simultaneously send uplink data by using a grant-free resource within a transmission time interval (TI), the network device 10 may deliver the indication information, for example, in a broadcast manner, to instruct the terminal device to determine the feedback result based on a receiving status of the pilot sequence index, where the receiving status includes that the terminal device 20 has received the pilot sequence index or has not received the pilot sequence index. If the network device 10 finds that within a period of time, always more than 13 terminal devices simultaneously send uplink data by using a grant-free resource within a TI, the network device 10 may deliver the indication information, for example, in a broadcast manner, to instruct the terminal device 20 to determine the feedback result based on the bitmap.

Manner 2:

Each time when indicating the feedback result, the network device 10 uses 1 bit in the feedback information, namely, the bitmap or the pilot sequence index to indicate a manner in which the terminal device 20 determines the feedback result indicated by the network device 10. After receiving the bitmap or the pilot sequence index, the terminal device 20 first determines content indicated by the indication information, and then determines the feedback result based on the indication information and the pilot sequence index.

Optionally, before the sending, by the network device 10, indication information to the terminal device 20, the method further includes: determining, by the network device 10, the indication information based on a quantity of terminal devices 20 that simultaneously perform uplink transmission and the quantity of pilot sequences that can be used for uplink transmission.

Specifically, a total quantity of pilot sequence indexes that can be indicated by a quantity of bit positions occupied by the pilot sequence index should be greater than or equal to a total quantity of pilot sequences that can be used for uplink transmission, and a total quantity of bit positions in the bitmap should be greater than or equal to the total quantity of pilot sequences that can be used for uplink transmission.

When a quantity of terminal devices that succeed in transmission exceeds a specific threshold, a total quantity of bits occupied by a plurality of pilot sequence indexes that need to be sent is greater than the total quantity of pilot sequences that can be used for uplink transmission, and in this case, the indication information may instruct the terminal device to determine the feedback result based on the bitmap; or when a quantity of terminal devices that succeed in transmission is less than a specific threshold, a total quantity of bits occupied by a plurality of pilot sequence indexes that need to be sent is less than the total quantity of pilot sequences that can be used for uplink transmission, and in this case, the indication information may instruct the terminal device to determine the feedback result based on the receiving status of the pilot sequence index.

Optionally, before the terminal device 20 determines the feedback result, indicated by the network device 10, of the uplink transmission based on the pilot sequence index, the method further includes: receiving, by the terminal device 20, indication information sent by the network device 10, where content indicated by the indication information includes: instructing the terminal device 20 to determine the feedback result based on the bitmap; or instructing the terminal device 20 to determine the feedback result based on a receiving status of the pilot sequence index, where the receiving status includes that the terminal device 20 has received the pilot sequence index or has not received the pilot sequence index.

In this case, that the terminal device 20 determines the feedback result, indicated by the network device 10, of the uplink transmission based on the pilot sequence index includes: determining, by the terminal device 20, the feedback result based on the indication information and the pilot sequence index.

With reference to Table 4 and Table 5, the following describes this embodiment in detail.

Specifically, to minimize transmission resources that are used for indicating the feedback result, the network device 10 may send the indication information to the terminal device 20, to indicate which of the two manners is used by the terminal device to determine the feedback result of current transmission.

Table 4 and Table 5 are respectively compositions of feedback information of uplink grant-free transmission in the two feedback result indication manners, where feedback information includes the bitmap or the pilot sequence index. Table 4 shows a manner in which the feedback result is indicated by using the bitmap. Table 5 shows a manner in which the feedback result is indicated by sending or not sending the pilot sequence index. Content in Table 4 and Table 5 includes at least: information about a transmission resource index, used to indicate a resource occupied by the uplink grant-free transmission; indication information for indicating whether the terminal device 20 determines the feedback result based on the bitmap or the receiving status of the pilot sequence index; and information indicating a feedback result of the uplink grant-free transmission of a plurality of terminal devices.

Values at bit positions in the upper right corners of Table 4 and Table 5 are used to indicate content indicated by the indication information, and values at bit positions in the second row and rows after the second row are used to indicate the feedback result. Bit positions carrying different types of information may be determined depending on an actual situation, and only an example is shown herein. It can be learned that, a value at a bit position in the upper right corner of Table 4 is 0, which may be used to instruct the terminal device 20 to determine the feedback result based on the bitmap; a value at a bit position in the upper right corner of Table 5 is 1, which may be used to instruct the terminal device 20 to determine the feedback result based on the receiving status of the pilot sequence index.

In the examples of Table 4 and Table 5, the indication information is 0, indicating that the terminal device 20 determines the feedback result based on the bitmap, and the indication information is 1, indicating that the terminal device 20 determines the feedback result based on the receiving status of the pilot sequence index; in addition, a value at a bit position is 1, indicating that the feedback result is an ACK, and a value at a bit position is 0, indicating that the feedback result is a NACK. However, this is not limited in this application.

It should be understood that, when the network device 10 indicates the feedback result by using the bitmap, a length of a field indicating that the feedback result is an ACK or a NACK is greater than or equal to the quantity of pilot sequences that can be used for uplink transmission. A size of the feedback information, namely, the bitmap, is relatively fixed. Because the fixed-length feedback information is used, an ACK and a NACK can be fed back simultaneously without increasing use of radio resources. When the network device 10 indicates the feedback result by sending the pilot sequence index, a size of the feedback information depends on a quantity of terminal devices that succeed in data transmission, namely, a quantity of ACKs that are fed back. As more terminal devices succeed in transmission, the feedback information, namely, a plurality of pilot sequence indexes corresponding to the terminal devices that succeed in transmission, occupy more resources. Therefore, a length of a feedback information field is variable.

TABLE 4

| Transmission resource index | | | | | | | 0 |
|---|---|---|---|---|---|---|---|
| 0 | 1 | 1 | 0 | 0 | 1 | 1 | 0 |
| 1 | 1 | 1 | 0 | 1 | 1 | 0 | 0 |
| ... | | | | | | | |
| 1 | 0 | 0 | 1 | 0 | 1 | 1 | 1 |

TABLE 5

| Transmission resource index | | | | | | | 1 |
|---|---|---|---|---|---|---|---|
| 0 | 0 | 0 | 0 | 0 | 0 | 0 | 0 |
| 0 | 0 | 0 | 0 | 0 | 0 | 1 | 1 |
| 0 | 0 | 0 | 1 | 0 | 1 | 1 | 1 |
| ... | | | | | | | |
| 0 | 1 | 1 | 1 | 0 | 1 | 0 | 0 |

It can be learned that Table 4 and Table 5 further include at least one bit position to indicate the transmission resource index, for example, a 7-bit transmission resource index shown in the first row of Table 4 and Table 5 each. To support a scenario in which a plurality of uplink grant-free transmission resources are configured in one subframe/frame, when sending the feedback information indicating the feedback result, the network device 10 may further add a transmission resource index to the feedback information, to indicate the uplink grant-free transmission resource corresponding to the feedback result.

Optionally, the method further includes: sending, by the network device 10, a transmission resource index to the terminal device 20, where the transmission resource index is used to indicate a location of a frequency domain resource used for the uplink transmission corresponding to the feedback result, and the location of the frequency domain resource is a location of the frequency domain resource in a plurality of frequency domain resources within a same time period.

For example, a plurality of uplink grant-free transmission resources may be simultaneously configured in one subframe. In this case, one terminal device may select a same pilot sequence or different pilot sequences simultaneously on the plurality of uplink grant-free transmission resources for uplink grant-free transmission. For example, if two uplink grant-free transmission resources are configured, and the terminal device 20 has two data blocks in simultaneous uplink transmission on two different uplink grant-free transmission resources, the network device 10 needs to separately indicate feedback results of the two uplink grant-free transmissions.

Figure 6:
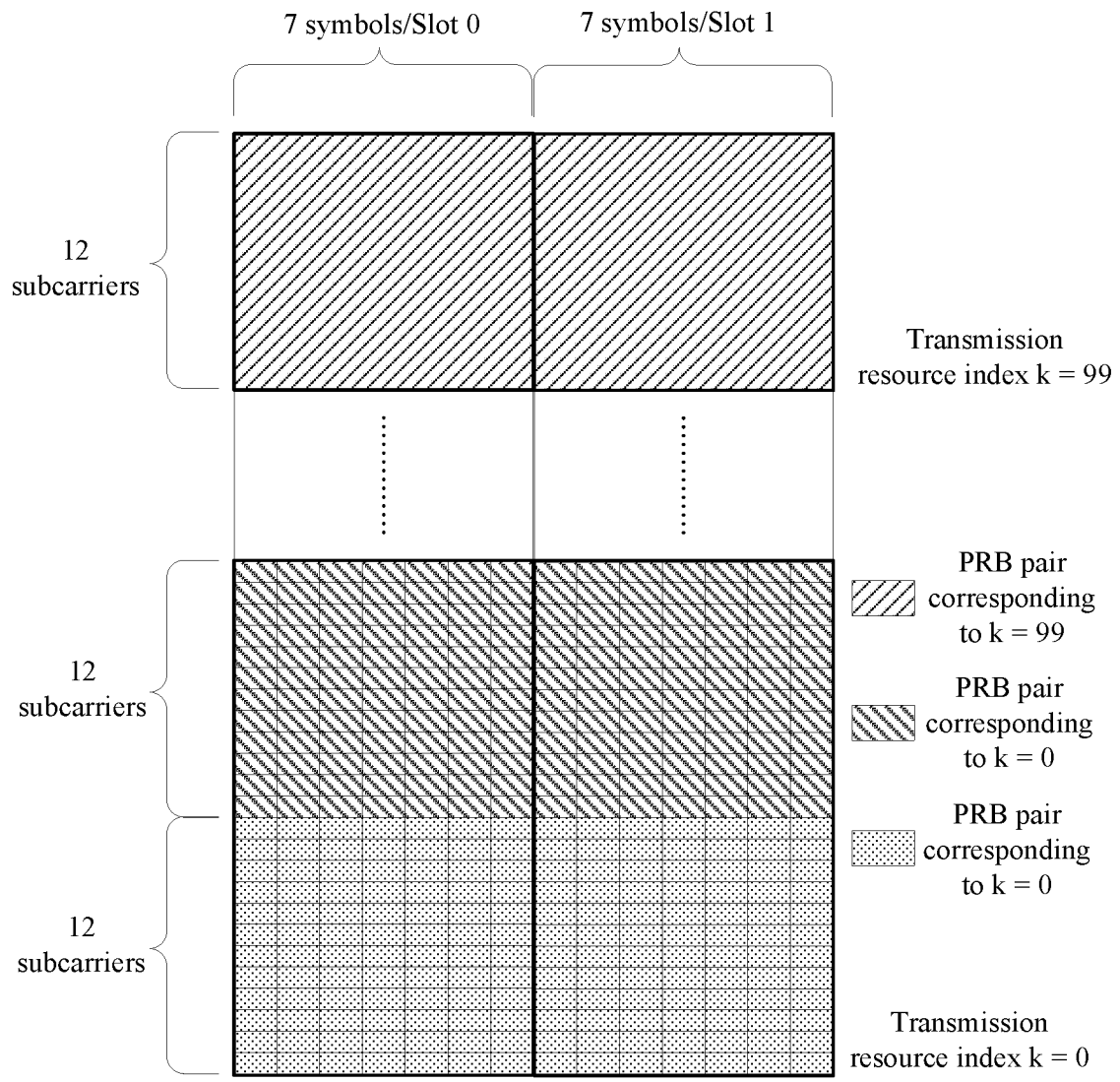
FIG. 6 is a schematic diagram of a transmission resource index according to an embodiment of this application.

Herein, an uplink grant-free transmission resource index (briefly referred to as a transmission resource index) may be used to distinguish between different uplink grant-free transmission resource configurations. It is assumed that the transmission resource index is a PRB index, and that 100 physical resource block (PRB) pairs in one subframe are used for uplink grant-free transmission is used as an example for description. One subframe includes two slots, 7 symbols and 12 subcarriers in each slot form one PRB, and every two PRBs form one PRB pair. If the uplink grant-free transmission resource can be configured as a minimum of one PRB pair, 7 bits may be used to indicate the transmission resource index, as shown in Table 4 and Table 5. FIG. 6 is a schematic diagram of a transmission resource index according to an embodiment of this application. The terminal device 20 has two data blocks in simultaneous uplink transmission on two different uplink grant-free transmission resources. In the two uplink grant-free transmission resources in one subframe, the first uplink grant-free transmission resource index is k=0, including two PRB pairs in total: a PRB pair 0 and a PRB pair 1, and the second uplink grant-free transmission resource index is k=99, including one PRB pair in total: a PRB pair 99. In this case, the transmission resource index may also be referred to as a PRB pair index, and usually is also referred to as a PRB index. After receiving the feedback information, the terminal device 20 may determine, based on the transmission resource index in the feedback information, whether data transmission performed by the terminal device 20 on a resource indicated by the transmission resource index fails or succeeds.

To be specific, if the terminal device 20 cannot distinguish between two time-frequency resource blocks, for example, feedback information of grant-free transmission on the two time-frequency resource blocks are scrambled by using a same scrambling sequence, the terminal device 20 needs to descramble two pieces of feedback information, for example, two pieces of DCI or two data blocks including the feedback result, and then learn, based on an indication of a PRB index, which time-frequency resource block corresponds to uplink transmission of the terminal device 20. If the terminal device 20 can distinguish between different time-frequency resource blocks, for example, feedback information of grant-free transmission on the two time-frequency resource blocks are scrambled by using different scrambling sequences, the terminal device 20 may identify, based on different scrambling sequences, a time-frequency resource block corresponding to uplink transmission of the terminal device 20. In this case, the PRB index may not be added to the feedback information.

Therefore, adding the transmission resource index to the feedback information can support simultaneous configuration of a plurality of uplink grant-free transmission resources within a same time period and effectively support simultaneous uplink grant-free transmission performed by the terminal device on a plurality of time-frequency resources.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

Figure 7:
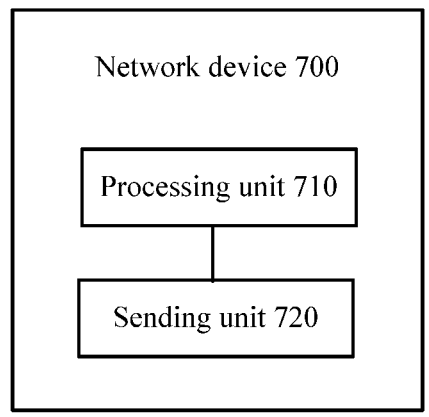
FIG. 7 is a structural block diagram of a network device according to an embodiment of this application.

With reference to FIG. 7, the following describes a network device for grant-free transmission according to an embodiment of this application. The technical features described in the method embodiments are applicable to the following apparatus embodiment.

FIG. 7 shows a network device 700 for data transmission according to an embodiment of this application. As shown in FIG. 7, the network device 700 includes: a processing unit 710, configured to detect a pilot sequence used by a terminal device for uplink transmission, where the processing unit 710 is further configured to determine a pilot sequence index of the pilot sequence based on the pilot sequence and a correspondence between the pilot sequence and the pilot sequence index; and a sending unit 720, configured to send information about a feedback result of the uplink transmission to the terminal device based on the pilot sequence index determined by the processing unit 710.

Therefore, the network device indicates the feedback result of the current uplink transmission to the terminal device by using the pilot sequence index, so as to efficiently use radio transmission resources to perform feedback on grant-free transmission of user equipment.

Optionally, the processing unit 710 is specifically configured to: determine, in a bitmap based on the pilot sequence index, a target bit position corresponding to the pilot sequence index, where each bit position in the bitmap corresponds to a different pilot sequence index; and determine a value at the target bit position based on the feedback result, where the value at the target bit position is used to indicate that the feedback result is an acknowledgement (ACK) or a negative acknowledgement (NACK).

The sending unit 720 is specifically configured to send the bitmap to the terminal device.

Optionally, a quantity of bit positions in the bitmap is greater than or equal to a quantity of pilot sequences that can be used for uplink transmission.

Optionally, the sending unit 720 is specifically configured to: send downlink control information (DCI) carried on a physical downlink control channel to the terminal device, where the DCI includes the bitmap; or send the bitmap carried on a physical downlink shared channel to the terminal device.

Optionally, the sending unit 720 is specifically configured to: if the feedback result is an ACK, send, by the network device, the pilot sequence index to the terminal device; or if the feedback result is a NACK, prohibit, by the network device, sending the pilot sequence index to the terminal device.

Optionally, a quantity of bit positions occupied by the pilot sequence index is determined based on a quantity of pilot sequences that can be used for uplink transmission.

Optionally, the sending unit 720 is specifically configured to: send downlink control information (DCI) carried on a physical downlink control channel to the terminal device, where the DCI includes the pilot sequence index; or send the pilot sequence index carried on a physical downlink shared channel to the terminal device.

Optionally, the sending unit 720 is further configured to: send indication information to the terminal device, where the indication information is used to: instruct the terminal device to determine the feedback result based on the bitmap; or instruct the terminal device to determine the feedback result based on a receiving status of the pilot sequence index, where the receiving status includes that the terminal device has received the pilot sequence index or has not received the pilot sequence index.

Optionally, before the sending unit 720 sends the indication information to the terminal device, the processing unit 710 is further configured to: determine the indication information based on a quantity of terminal devices that simultaneously perform uplink transmission and the quantity of pilot sequences that can be used for uplink transmission.

Optionally, the sending unit 720 is further configured to: send a transmission resource index to the terminal device, where the transmission resource index is used to indicate a location of a frequency domain resource used for the uplink transmission corresponding to the feedback result, and the location of the frequency domain resource is a location of the frequency domain resource in a plurality of frequency domain resources within a same time period.

Figure 8:
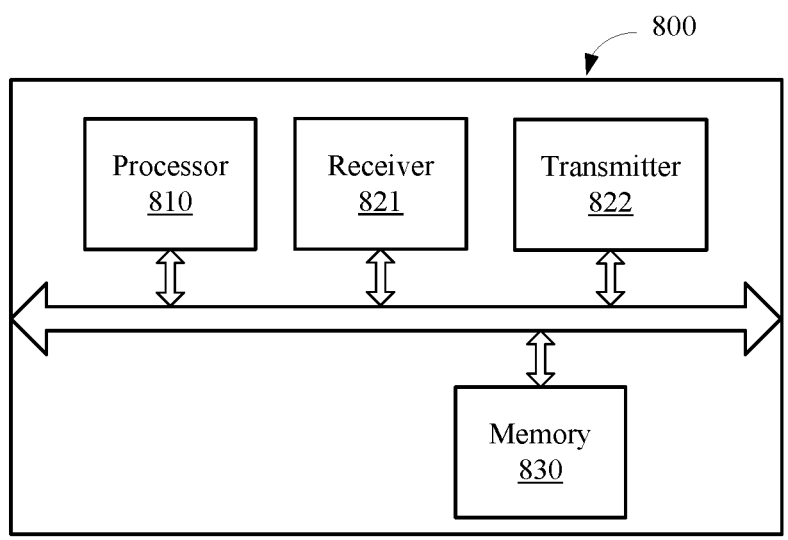
FIG. 8 is a structural block diagram of a network device according to an embodiment of this application.

It should be noted that, in this embodiment of this application, the processing unit 710 may be implemented by a processor, the sending unit 720 may be implemented by a transceiver, and the processing unit 710 may be implemented by a processor. As shown in FIG. 8, a network device 800 may include a processor 810, a transceiver 820, and a memory 830. The transceiver 820 may include a receiver 821 and a transmitter 822, and the memory 830 may be configured to store code and the like to be executed by the processor 810. The components of the network device 800 are connected to each other through an internal connection path.

The processor 810 is configured to detect a pilot sequence used by a terminal device for uplink transmission, and determine a pilot sequence index of the pilot sequence based on the pilot sequence and a correspondence between a pilot sequence and a pilot sequence index.

The transmitter 822 is configured to send information about a feedback result of the uplink transmission to the terminal device based on the pilot sequence index determined by the processor 810.

Optionally, the processor 810 is specifically configured to: determine, in a bitmap based on the pilot sequence index, a target bit position corresponding to the pilot sequence index, where each bit position in the bitmap corresponds to a different pilot sequence index; and determine a value at the target bit position based on the feedback result, where the value at the target bit position is used to indicate that the feedback result is an acknowledgement (ACK) or a negative acknowledgement (NACK).

The transmitter 822 is specifically configured to send the bitmap to the terminal device.

Optionally, a quantity of bit positions in the bitmap is greater than or equal to a quantity of pilot sequences that can be used for uplink transmission.

Optionally, the transmitter 822 is specifically configured to: send downlink control information (DCI) carried on a physical downlink control channel to the terminal device, where the DCI includes the bitmap; or send the bitmap carried on a physical downlink shared channel to the terminal device.

Optionally, the transmitter 822 is specifically configured to: if the feedback result is an ACK, send, by the network device, the pilot sequence index to the terminal device; or if the feedback result is a NACK, prohibit, by the network device, sending the pilot sequence index to the terminal device.

Optionally, a quantity of bit positions occupied by the pilot sequence index is determined based on a quantity of pilot sequences that can be used for uplink transmission.

Optionally, the transmitter 822 is specifically configured to: send downlink control information DCI carried on a physical downlink control channel to the terminal device, where the DCI includes the pilot sequence index; or send the pilot sequence index carried on a physical downlink shared channel to the terminal device.

Optionally, the transmitter 822 is further configured to: send indication information to the terminal device, where the indication information is used to: instruct the terminal device to determine the feedback result based on the bitmap; or instruct the terminal device to determine the feedback result based on a receiving status of the pilot sequence index, where the receiving status includes that the terminal device has received the pilot sequence index or has not received the pilot sequence index.

Optionally, before the transmitter 822 sends the indication information to the terminal device, the processor 810 is further configured to: determine the indication information based on a quantity of terminal devices that simultaneously perform uplink transmission and the quantity of pilot sequences that can be used for uplink transmission.

Optionally, the transmitter 822 is further configured to: send a transmission resource index to the terminal device, where the transmission resource index is used to indicate a location of a frequency domain resource used for the uplink transmission corresponding to the feedback result, and the location of the frequency domain resource is a location of the frequency domain resource in a plurality of frequency domain resources within a same time period.

Figure 9:
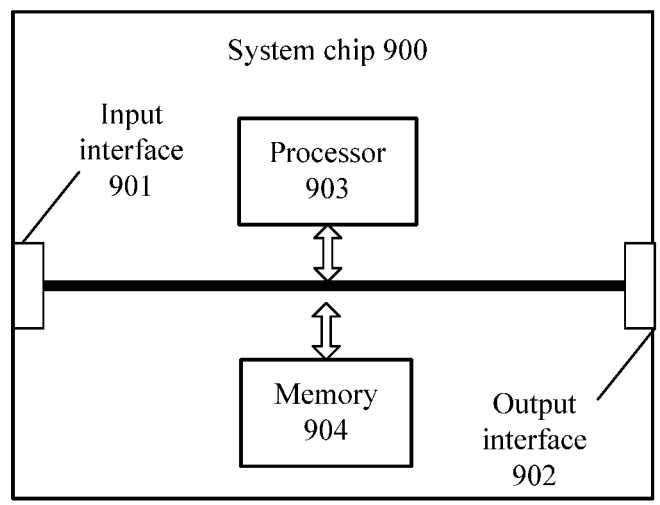
FIG. 9 is a schematic structural diagram of a system chip according to an embodiment of this application.

FIG. 9 is a schematic structural diagram of a system chip according to an embodiment of this application. The system chip 900 in FIG. 9 includes an input interface 901, an output interface 902, at least one processor 903, and a memory 904. The input interface 901, the output interface 902, the processor 903, and the memory 904 are connected to each other through an internal connection path. The processor 903 is configured to execute code in the memory 904, and when the code is executed, the processor 903 implements the method performed by the network device in FIG. 3 to FIG. 6.

The network device 700 shown in FIG. 7 or the network device 800 shown in FIG. 8 or the system chip 900 shown in FIG. 9 can implement the processes implemented by the network device in the foregoing method embodiments in FIG. 3 to FIG. 6. To avoid repetition, details are not described herein again.

With reference to FIG. 100, the following describes a network device for grant-free transmission according to an embodiment of this application. The technical features described in the method embodiments are applicable to the following apparatus embodiment.

Figure 10:
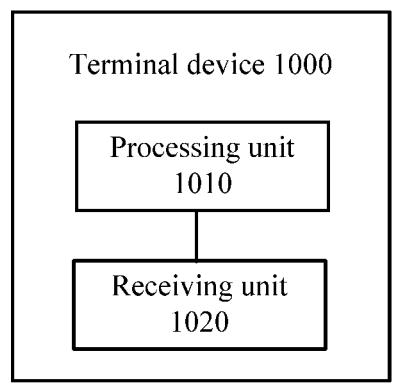
FIG. 10 is a structural block diagram of a terminal device according to an embodiment of this application.

FIG. 10 shows a terminal device 1000 for data transmission according to an embodiment of this application. As shown in FIG. 100, the terminal device 1000 includes: a processing unit 1010, configured to determine, based on a pilot sequence used for uplink transmission and a correspondence between a pilot sequence and a pilot sequence index, a pilot sequence index of the pilot sequence; and a receiving unit 1020, configured to receive information that is about a feedback result of the uplink transmission and that is sent by a network device, where the processing unit 1010 is further configured to determine the feedback result of the uplink transmission based on the pilot sequence index determined by the processing unit and the information that is about the feedback result of the uplink transmission and that is received by the receiving unit.

Therefore, in this embodiment of this application, the terminal device determines the feedback result, indicated by the network device, of the current uplink transmission by using the pilot sequence index, so as to efficiently use radio transmission resources to obtain feedback performed by the network device on grant-free transmission.

Optionally, the receiving unit 1020 is specifically configured to: receive a bitmap sent by the network device, where each bit position in the bitmap corresponds to a different pilot sequence index.

The processing unit 1010 is specifically configured to:

determine, in the bitmap based on the pilot sequence index, a target bit position corresponding to the pilot sequence index; and determine the feedback result based on a value at the target bit position, where the value at the target bit position is used to indicate that the feedback result is an acknowledgement (ACK) or a negative acknowledgement (NACK).

Optionally, the sending unit is specifically configured to: receive downlink control information (DCI) carried on a physical downlink control channel and sent by the network device, where the DCI includes the bitmap; or receive the bitmap carried on a physical downlink shared channel and sent by the network device.

Optionally, the processing unit 1010 is specifically configured to: if the terminal device has received the pilot sequence index sent by the network device, determine, by the terminal device, that the feedback result is an ACK; or if the terminal device has not received the pilot sequence index sent by the network device, determine, by the terminal device, that the feedback result is a NACK.

Optionally, the pilot sequence index is received by the receiving unit 1020 through a physical downlink control channel, and DCI carried on the physical downlink control channel includes the pilot sequence index; or the pilot sequence index is received by the receiving unit 1020 through a physical downlink shared channel.

Optionally, before the processing unit 1010 determines the feedback result, indicated by the network device, of the uplink transmission based on the pilot sequence index, the receiving unit 1020 is further configured to: receive indication information sent by the network device, where the indication information is used to: instruct the terminal device to determine the feedback result based on the bitmap; or instruct the terminal device to determine the feedback result based on a receiving status of the pilot sequence index, where the receiving status includes that the terminal device has received the pilot sequence index or has not received the pilot sequence index.

The processing unit 1010 is specifically configured to: determine the feedback result based on the indication information and the pilot sequence index.

Optionally, the receiving unit 1020 is further configured to: receive a transmission resource index sent by the network device, where the transmission resource index is used to indicate a location of a frequency domain resource used for the uplink transmission corresponding to the feedback result, and the location of the frequency domain resource is a location of the frequency domain resource in a plurality of frequency domain resources within a same time period.

The processing unit 1010 is specifically configured to: determine the feedback result based on the pilot index and the transmission resource index.

Figure 11:
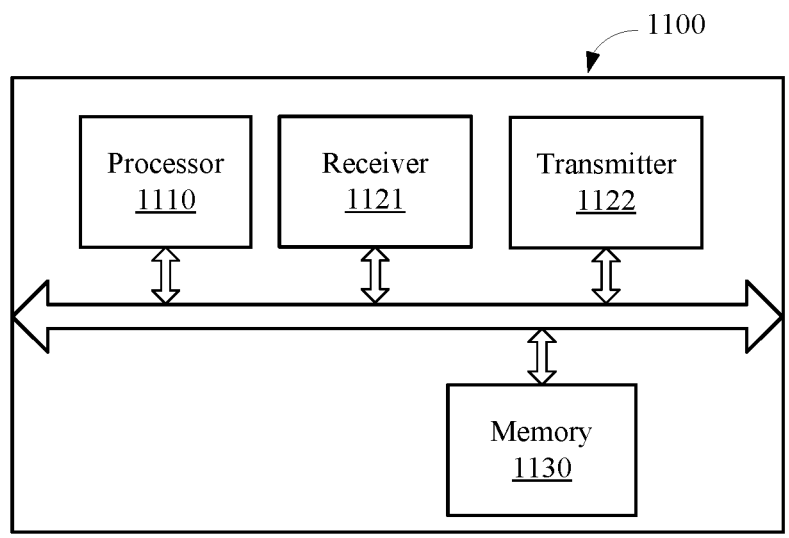
FIG. 11 is a structural block diagram of a terminal device according to an embodiment of this application.

It should be noted that, in this embodiment of this application, the processing unit 1010 may be implemented by a processor, the sending unit 1020 may be implemented by a transceiver, and the processing unit 1010 may be implemented by a processor. As shown in FIG. 11, a terminal device 1100 may include a processor 1110, a transceiver 1120, and a memory 1130. The transceiver 1120 may include a receiver 1121 and a transmitter 1122, and the memory 1130 may be configured to store code and the like to be executed by the processor 1110. The components of the network device 1100 are connected to each other through an internal connection path.

The processor 1110 is configured to determine, based on a pilot sequence used for uplink transmission and a correspondence between a pilot sequence and a pilot sequence index, a pilot sequence index of the pilot sequence.

The receiver 1121 is configured to receive information that is about a feedback result of the uplink transmission and that is sent by a network device.

The processor 1110 is further configured to determine the feedback result of the uplink transmission based on the pilot sequence index determined by the processing unit and the information that is about the feedback result of the uplink transmission and that is received by the receiving unit.

Optionally, the receiver 1121 is specifically configured to: receive a bitmap sent by the network device, where each bit position in the bitmap corresponds to a different pilot sequence index.

The processor 1110 is specifically configured to: determine, in the bitmap based on the pilot sequence index, a target bit position corresponding to the pilot sequence index; and determine the feedback result based on a value at the target bit position, where the value at the target bit position is used to indicate that the feedback result is an acknowledgement (ACK) or a negative acknowledgement (NACK).

Optionally, the sending unit is specifically configured to: receive downlink control information (DCI) carried on a physical downlink control channel and sent by the network device, where the DCI includes the bitmap; or receive the bitmap carried on a physical downlink shared channel and sent by the network device.

Optionally, the processor 1110 is specifically configured to: if the terminal device has received the pilot sequence index sent by the network device, determine, by the terminal device, that the feedback result is an ACK; or if the terminal device has not received the pilot sequence index sent by the network device, determine, by the terminal device, that the feedback result is a NACK.

Optionally, the pilot sequence index is received by the receiver 1121 through a physical downlink control channel, and DCI carried on the physical downlink control channel includes the pilot sequence index; or the pilot sequence index is received by the receiver 1121 through a physical downlink shared channel.

Optionally, before the processor 1110 determines the feedback result, indicated by the network device, of the uplink transmission based on the pilot sequence index, the receiver 1121 is further configured to: receive indication information sent by the network device, where the indication information is used to: instruct the terminal device to determine the feedback result based on the bitmap; or instruct the terminal device to determine the feedback result based on a receiving status of the pilot sequence index, where the receiving status includes that the terminal device has received the pilot sequence index or has not received the pilot sequence index.

The processor 1110 is specifically configured to: determine the feedback result based on the indication information and the pilot sequence index.

Optionally, the receiver 1121 is further configured to: receive a transmission resource index sent by the network device, where the transmission resource index is used to indicate a location of a frequency domain resource used for the uplink transmission corresponding to the feedback result, and the location of the frequency domain resource is a location of the frequency domain resource in a plurality of frequency domain resources within a same time period.

The processor 1110 is specifically configured to: determine the feedback result based on the pilot index and the transmission resource index.

Figure 12:
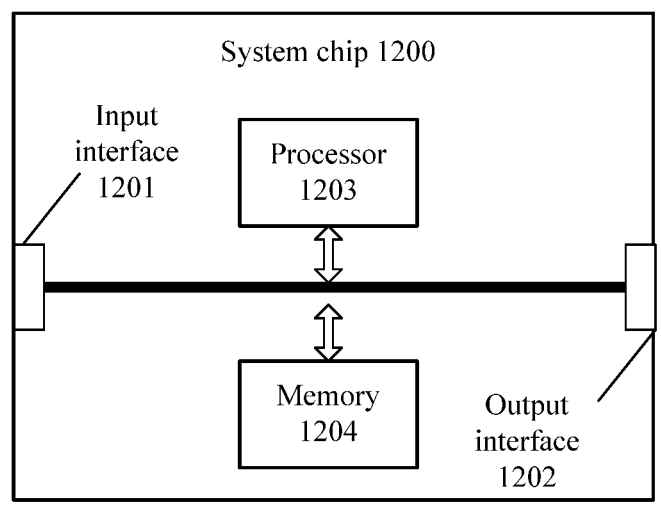
FIG. 12 is a schematic structural diagram of a system chip according to an embodiment of this application.

FIG. 12 is a schematic structural diagram of a system chip according to an embodiment of this application. The system chip 1200 in FIG. 12 includes an input interface 1201, an output interface 1202, at least one processor 1203, and a memory 1204. The input interface 1201, the output interface 1202, the processor 1203, and the memory 1204 are connected to each other through an internal connection path. The processor 1203 is configured to execute code in the memory 1204, and when the code is executed, the processor 1203 implements the method performed by the terminal device in FIG. 3 to FIG. 6.

The terminal device 1000 shown in FIG. 10 or the terminal device 1100 shown in FIG. 11 or the system chip 1200 shown in FIG. 12 can implement the processes implemented by the terminal device in the foregoing method embodiments in FIG. 3 to FIG. 6. To avoid repetition, details are not described herein again.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   detecting, by a network device, a pilot sequence used by a terminal device for a grant-free uplink transmission transmitted by the terminal device to the network device;
   determining, by the network device, a pilot sequence index of the pilot sequence based on the pilot sequence and a correspondence between the pilot sequence and the pilot sequence index; and sending, by the network device, information about a feedback result of the uplink transmission to the terminal device using the pilot sequence index, the feedback result indicating whether or not the uplink transmission is received by the network device successfully.

2. The method according to claim 1, wherein sending, by the network device, the information about the feedback result of the uplink transmission to the terminal device using the pilot sequence index comprises:

determining, by the network device in a bitmap based on the pilot sequence index, a target bit position corresponding to the pilot sequence index, wherein each bit position in the bitmap corresponds to a different pilot sequence index;

determining, by the network device, a value at the target bit position based on the feedback result, wherein the value at the target bit position indicates that the feedback result is an acknowledgement (ACK) or a negative acknowledgement (NACK); and sending, by the network device, the bitmap to the terminal device, with the determined value set at the target bit position of the bitmap.

3. The method according to claim 1, wherein sending, by the network device, the information about the feedback result of the uplink transmission to the terminal device using the pilot sequence index comprises:

when the feedback result is an ACK, sending, by the network device, the pilot sequence index to the terminal device; or when the feedback result is a NACK, prohibiting, by the network device, sending the pilot sequence index to the terminal device.

4. The method according to claim 1, wherein the method further comprises:

sending, by the network device, indication information to the terminal device, wherein the indication information is used to:

instruct the terminal device to determine the feedback result based on a bitmap; or instruct the terminal device to determine the feedback result based on a receiving status of the pilot sequence index, wherein the receiving status indicates whether or not the terminal device, after transmitting the uplink transmission, has received the pilot sequence index sent by the network device.

5. The method according to claim 1, wherein the method further comprises:

sending, by the network device, a transmission resource index to the terminal device, wherein the transmission resource index indicates a location of a frequency domain resource in a plurality of frequency domain resources within a same time period, the frequency domain resource having been used for the uplink transmission corresponding to the feedback result.

6. A method comprising:

determining, by a terminal device, based on a pilot sequence used for a grant-free uplink transmission and a correspondence between the pilot sequence and a pilot sequence index, the pilot sequence index of the pilot sequence, the uplink transmission being sent by the terminal device to a network device;

receiving, by the terminal device from the network device, information that is about a feedback result of the uplink transmission, the feedback result indicating whether or not the uplink transmission is received by the network device successfully, and the feedback result being indicated using the pilot sequence index; and determining, by the terminal device, the feedback result of the uplink transmission based on the pilot sequence index and the information about the feedback result of the uplink transmission.

7. The method according to claim 6, wherein receiving, by the terminal device, the information about the feedback result of the uplink transmission comprises:

receiving, by the terminal device, a bitmap sent by the network device, wherein each bit position in the bitmap corresponds to a different pilot sequence index; and determining, by the terminal device, the feedback result of the uplink transmission based on the pilot sequence index and the information about the feedback result of the uplink transmission comprises:

determining, by the terminal device in the bitmap based on the pilot sequence index, a target bit position corresponding to the pilot sequence index; and determining, by the terminal device, the feedback result based on a value at the target bit position, wherein the value at the target bit position indicates that the feedback result is an acknowledgement (ACK) or a negative acknowledgement (NACK).

8. The method according to claim 6, wherein determining, by the terminal device, the feedback result of the uplink transmission based on the pilot sequence index and the information about the feedback result of the uplink transmission comprises:

when the terminal device has received the pilot sequence index sent by the network device after sending the uplink transmission, determining, by the terminal device, that the feedback result is an ACK; or when the terminal device, after sending the uplink transmission, has not received the pilot sequence index sent by the network device, determining, by the terminal device, that the feedback result is a NACK.

9. The method according to claim 6, wherein before determining, by the terminal device, the feedback result of the uplink transmission based on the pilot sequence index, the method further comprises:

receiving, by the terminal device, indication information sent by the network device, wherein the indication information is used to:

instruct the terminal device to determine the feedback result based on a bitmap; or instruct the terminal device to determine the feedback result based on a receiving status of the pilot sequence index, wherein the receiving status indicates whether or not the terminal device has received the pilot sequence index from the network device after sending the uplink transmission; and determining, by the terminal device, the feedback result of the uplink transmission based on the pilot sequence index comprises:

determining, by the terminal device, the feedback result based on the indication information and the pilot sequence index.

10. The method according to claim 6, wherein the method further comprises:

receiving, by the terminal device, a transmission resource index sent by the network device, wherein the transmission resource index indicates a location of a frequency domain resource in a plurality of frequency domain resources within a same time period, the frequency domain resource having been used for the uplink transmission corresponding to the feedback result; and determining, by the terminal device, the feedback result of the uplink transmission based on the pilot sequence index comprises:

determining, by the terminal device, the feedback result based on the pilot sequence index and the transmission resource index.

11. A network device comprising a processor, a transceiver, and a memory, wherein the memory is configured to store an instruction, the processor is configured to execute the instruction stored in the memory, and when the processor executes the instruction stored in the memory, the network device is enabled to implement steps of:

detecting a pilot sequence used by a terminal device for a grant-free uplink transmission transmitted by the terminal device to the network device;

determining a pilot sequence index of the pilot sequence based on the pilot sequence and a correspondence between the pilot sequence and the pilot sequence index; and sending information about a feedback result of the uplink transmission to the terminal device using the pilot sequence index, the feedback result indicating whether or not the uplink transmission is received by the network device successfully.

12. The network device according to claim 11, wherein the network device is enabled to implement steps of:

determining in a bitmap based on the pilot sequence index, a target bit position corresponding to the pilot sequence index, wherein each bit position in the bitmap corresponds to a different pilot sequence index;

determining a value at the target bit position based on the feedback result, wherein the value at the target bit position indicates that the feedback result is an acknowledgement (ACK) or a negative acknowledgement (NACK); and sending the bitmap to the terminal device, with the determined value set at the target bit position of the bitmap.

13. The network device according to claim 11, wherein the network device is enabled to implement steps of:

when the feedback result is an ACK, sending the pilot sequence index to the terminal device; or when the feedback result is a NACK, prohibiting sending the pilot sequence index to the terminal device.

14. The network device according to claim 11, wherein the network device is enabled to implement steps of:

sending indication information to the terminal device, wherein the indication information is used to:

instruct the terminal device to determine the feedback result based on a bitmap; or instruct the terminal device to determine the feedback result based on a receiving status of the pilot sequence index, wherein the receiving status indicates whether or not the terminal device, after transmitting the uplink transmission, has received the pilot sequence index sent by the network device.

15. The network device according to claim 11, wherein the network device is enabled to implement steps of:

sending a transmission resource index to the terminal device, wherein the transmission resource index indicates a location of a frequency domain resource in a plurality of frequency domain resources within a same time period, the frequency domain resource having been used for the uplink transmission corresponding to the feedback result.

16. A terminal device comprising a processor, a transceiver, and a memory, wherein the memory is configured to store an instruction, the processor is configured to execute the instruction stored in the memory, and when the processor executes the instruction stored in the memory, the terminal device is enabled to implement steps:

determining, based on a pilot sequence used for a grant-free uplink transmission and a correspondence between the pilot sequence and a pilot sequence index, the pilot sequence index of the pilot sequence, the uplink transmission being sent by the terminal device to a network device;

receiving, from the network device, information about a feedback result of the uplink transmission, the feedback result indicating whether or not the uplink transmission is received by the network device successfully, and the feedback result being indicated using the pilot sequence index; and determining the feedback result of the uplink transmission based on the pilot sequence index and the information about the feedback result of the uplink transmission.

17. The terminal device according to claim 16, wherein receiving the information about the feedback result of the uplink transmission comprises:

receiving a bitmap sent by the network device, wherein each bit position in the bitmap corresponds to a different pilot sequence index; and determining in the bitmap based on the pilot sequence index, a target bit position corresponding to the pilot sequence index; and determining the feedback result based on a value at the target bit position, wherein the value at the target bit position indicates that the feedback result is an acknowledgement (ACK) or a negative acknowledgement (NACK).

18. The terminal device according to claim 16, wherein the terminal device is enabled to implement steps of:

when the terminal device has received the pilot sequence index sent by the network device after sending the uplink transmission, determining that the feedback result is an ACK; or when the terminal device, after sending the uplink transmission, has not received the pilot sequence index sent by the network device, determining that the feedback result is a NACK.

19. The terminal device according to claim 16, wherein the terminal device is enabled to implement steps of:

receiving indication information sent by the network device, wherein the indication information is used to:

instruct the terminal device to determine the feedback result based on a bitmap; or instruct the terminal device to determine the feedback result based on a receiving status of the pilot sequence index, wherein the receiving status indicates whether or not the terminal device has received the pilot sequence index from the network device after sending the uplink transmission; and determining the feedback result based on the indication information and the pilot sequence index.

20. The terminal device according to claim 16, wherein the terminal device is enabled to implement steps of:

receiving a transmission resource index sent by the network device, wherein the transmission resource index indicates a location of a frequency domain resource in a plurality of frequency domain resources within a same time period, the frequency domain resource having been used for the uplink transmission corresponding to the feedback result; and determining the feedback result based on the pilot sequence index and the transmission resource index.

* * * * *

UNITED STATES PATENT AND TRADEMARK OFFICE
CERTIFICATE OF CORRECTION

PATENT NO. : 10,757,725 B2
APPLICATION NO. : 16/365052
DATED : August 25, 2020
INVENTOR(S) : Jinfang Zhang et al.

Page 1 of 1

It is certified that error appears in the above-identified patent and that said Letters Patent is hereby corrected as shown below:

In the Claims

In Column 33, Line 65, Claim 6, delete "information that is about" and insert --information about--.

Signed and Sealed this
Twenty-seventh Day of October, 2020

Andrei Iancu
*Director of the United States Patent and Trademark Office*